US008500537B2

(12) United States Patent
Walker et al.

(10) Patent No.: US 8,500,537 B2
(45) Date of Patent: Aug. 6, 2013

(54) GROUP PLAY OF A LOTTERY GAME

(75) Inventors: Jay S. Walker, Ridgefield, CT (US); Michael W. Patterson, New York, NY (US); Nancy Palumbo, New York, NY (US); Stephen C. Tulley, Monroe, CT (US)

(73) Assignee: Walker Digital, LLC, Stamford, CT (US)

( * ) Notice: Subject to any disclaimer, the term of this patent is extended or adjusted under 35 U.S.C. 154(b) by 181 days.

(21) Appl. No.: 12/600,422

(22) PCT Filed: May 16, 2008

(86) PCT No.: PCT/US2008/063933
§ 371 (c)(1), (2), (4) Date: Apr. 23, 2010

(87) PCT Pub. No.: WO2008/144536
PCT Pub. Date: Nov. 27, 2008

(65) Prior Publication Data
US 2011/0059786 A1 Mar. 10, 2011

Related U.S. Application Data

(60) Provisional application No. 60/938,666, filed on May 17, 2007.

(51) Int. Cl.
*G06F 17/00* (2006.01)

(52) U.S. Cl.
USPC .......... 463/17

(58) Field of Classification Search
USPC .......... 463/16–25
See application file for complete search history.

(56) References Cited

U.S. PATENT DOCUMENTS

| | | | | |
|---|---|---|---|---|
| 4,157,829 | A | 6/1979 | Goldman et al. | 463/17 |
| 4,317,957 | A | 3/1982 | Sendrow | 705/71 |
| 4,467,424 | A | 8/1984 | Hedges et al. | 364/412 |
| 4,494,197 | A | 1/1985 | Troy et al. | 463/18 |
| 4,531,187 | A | 7/1985 | Uhland | 364/412 |
| 4,593,904 | A | 6/1986 | Graves | |
| 4,652,998 | A | 3/1987 | Koza et al. | 463/26 |
| 4,669,731 | A | 6/1987 | Clarke | 273/143 R |

(Continued)

FOREIGN PATENT DOCUMENTS

| | | |
|---|---|---|
| EP | 0 032 410 A1 | 7/1981 |
| EP | 0 106 187 B1 | 11/1985 |

(Continued)

OTHER PUBLICATIONS

Cave, Kathy, “The Lake Effect”, Milwaukee Journal Sentinel, Mar. 27, 1996, Section: News, p. 8.

(Continued)

*Primary Examiner* — Ronald Laneau
(74) *Attorney, Agent, or Firm* — Fincham Downs, LLC; Michael D. Downs

(57) ABSTRACT

Methods and systems for facilitating play of group lottery games are described. In an embodiment, a process includes establishing at least two groups for play of a group lottery game, wherein each group includes a plurality of players. The method also includes determining at least one winning player from each group of a first round of the multiplayer lottery game, and advancing each of the winning players to a second round.

15 Claims, 19 Drawing Sheets

U.S. PATENT DOCUMENTS

| | | | | |
|---|---|---|---|---|
| 4,689,742 | A | 8/1987 | Troy et al. | 463/25 |
| 4,698,564 | A | 10/1987 | Slavin | 318/257 |
| 4,755,941 | A | 7/1988 | Bacchi | 364/412 |
| 4,760,527 | A | 7/1988 | Sidley | 463/13 |
| 4,764,666 | A | 8/1988 | Bergeron | 235/380 |
| 4,805,907 | A | 2/1989 | Hagiwara | |
| 4,837,728 | A | 6/1989 | Barrie et al. | 463/27 |
| 4,842,278 | A | 6/1989 | Markowitz | 463/18 |
| 4,856,787 | A | 8/1989 | Itkis | 273/237 |
| 4,880,237 | A | 11/1989 | Kishishita | 273/138 A |
| 4,951,039 | A | 8/1990 | Schwendeman et al. | 345/473 |
| 4,982,337 | A | 1/1991 | Burr et al. | 700/235 |
| 4,991,848 | A | 2/1991 | Greenwood et al. | 273/143 R |
| 5,038,022 | A | 8/1991 | Lucero | 463/25 |
| 5,042,809 | A | 8/1991 | Richardson | 463/18 |
| 5,069,453 | A | 12/1991 | Koza et al. | 463/17 |
| 5,083,271 | A | 1/1992 | Thacher et al. | 700/92 |
| 5,096,195 | A | 3/1992 | Gimmon | 463/20 |
| 5,112,050 | A | 5/1992 | Koza et al. | 463/17 |
| 5,119,295 | A | 6/1992 | Kapur | 463/41 |
| 5,123,649 | A | 6/1992 | Tiberio | 273/143 R |
| 5,178,390 | A | 1/1993 | Okada | 273/143 R |
| 5,179,517 | A | 1/1993 | Sarbin et al. | 463/25 |
| 5,223,698 | A | 6/1993 | Kapur | 235/375 |
| 5,239,165 | A | 8/1993 | Novak | 235/375 |
| 5,253,275 | A | 10/1993 | Yurt et al. | |
| 5,259,613 | A | 11/1993 | Marnell, II | |
| 5,275,400 | A | 1/1994 | Weingardt et al. | 273/999 |
| 5,276,312 | A | 1/1994 | McCarthy | 463/26 |
| 5,277,424 | A | 1/1994 | Wilms | 463/12 |
| 5,283,734 | A | 2/1994 | Von Kohorn | 463/17 |
| 5,287,269 | A | 2/1994 | Dorrough et al. | 364/408 |
| 5,290,033 | A | 3/1994 | Bittner et al. | 463/25 |
| 5,324,035 | A | 6/1994 | Morris et al. | 463/42 |
| 5,330,185 | A | 7/1994 | Wells | 463/29 |
| 5,377,975 | A | 1/1995 | Clapper | 463/16 |
| 5,380,007 | A | 1/1995 | Travis et al. | 463/18 |
| 5,393,057 | A | 2/1995 | Marnell, II | 463/13 |
| 5,398,932 | A | 3/1995 | Eberhardt et al. | 463/29 |
| 5,401,024 | A | 3/1995 | Simunek | 273/138 A |
| 5,407,199 | A | 4/1995 | Gumina | |
| 5,413,357 | A | 5/1995 | Schulze et al. | 463/5 |
| 5,415,416 | A | 5/1995 | Scagnelli et al. | 463/25 |
| 5,417,424 | A | 5/1995 | Snowden et al. | 463/18 |
| 5,429,361 | A | 7/1995 | Raven et al. | 273/138 A |
| 5,436,367 | A | 7/1995 | Iwata et al. | 379/210.01 |
| 5,457,306 | A | 10/1995 | Lucero | |
| 5,470,079 | A | 11/1995 | LeStrange et al. | 463/25 |
| 5,518,253 | A | 5/1996 | Pocock et al. | 463/19 |
| 5,536,008 | A | 7/1996 | Clapper | 463/16 |
| 5,551,692 | A | 9/1996 | Pettit et al. | 217/64 |
| 5,564,700 | A | 10/1996 | Celona | 463/27 |
| 5,569,082 | A | 10/1996 | Kaye | 463/17 |
| 5,570,885 | A | 11/1996 | Ornstein | 463/27 |
| 5,580,311 | A | 12/1996 | Haste, III | 463/17 |
| 5,586,936 | A | 12/1996 | Bennett et al. | 463/25 |
| 5,595,538 | A | 1/1997 | Haste, III | 463/17 |
| 5,609,337 | A | 3/1997 | Clapper, Jr. | 273/138.2 |
| 5,613,912 | A | 3/1997 | Slater | 463/25 |
| 5,621,200 | A | 4/1997 | Irwin et al. | 235/375 |
| 5,634,012 | A | 5/1997 | Stefik et al. | 395/239 |
| 5,647,592 | A | 7/1997 | Gerow | 273/139 |
| 5,647,798 | A | 7/1997 | Falciglia | 463/19 |
| 5,651,548 | A | 7/1997 | French et al. | 273/309 |
| 5,657,899 | A | 8/1997 | Stoken | 463/17 |
| 5,697,844 | A | 12/1997 | Von Kohorn | 463/40 |
| 5,707,285 | A | 1/1998 | Place et al. | 463/12 |
| 5,735,432 | A | 4/1998 | Stoken et al. | 221/2 |
| 5,735,742 | A | 4/1998 | French | 463/25 |
| 5,741,183 | A | 4/1998 | Acres et al. | 463/42 |
| 5,743,800 | A | 4/1998 | Huard et al. | 463/26 |
| 5,749,784 | A | 5/1998 | Clapper, Jr. | 463/17 |
| 5,758,875 | A | 6/1998 | Giacalone, Jr. | 273/143 R |
| 5,762,552 | A | 6/1998 | Vuong et al. | 463/25 |
| 5,766,075 | A | 6/1998 | Cook et al. | 463/25 |
| 5,768,382 | A | 6/1998 | Schneier et al. | 380/251 |
| 5,770,533 | A | 6/1998 | Franchi | 463/42 |
| 5,772,509 | A | 6/1998 | Weiss | 463/16 |
| RE35,864 | E | 7/1998 | Weingardt | 463/28 |
| 5,779,548 | A | 7/1998 | Asai et al. | |
| 5,779,549 | A | 7/1998 | Walker et al. | 463/42 |
| 5,781,647 | A | 7/1998 | Fishbine | 382/1 |
| 5,788,573 | A | 8/1998 | Baerlocher et al. | 463/16 |
| 5,803,808 | A | 9/1998 | Strisower | 463/11 |
| 5,816,917 | A | 10/1998 | Kelmer et al. | 463/16 |
| 5,816,919 | A | 10/1998 | Scagnelli et al. | 463/25 |
| 5,830,063 | A | 11/1998 | Byrne | 463/18 |
| 5,830,067 | A | 11/1998 | Graves et al. | |
| 5,833,538 | A | 11/1998 | Weiss | 463/21 |
| 5,848,932 | A | 12/1998 | Adams | 463/20 |
| 5,871,398 | A | 2/1999 | Schneier et al. | 463/16 |
| 5,910,048 | A | 6/1999 | Feinberg | 463/25 |
| 5,915,588 | A | 6/1999 | Stoken et al. | 221/2 |
| 5,919,090 | A | 7/1999 | Mothwurf | 463/25 |
| 5,951,397 | A | 9/1999 | Dickinson | 463/36 |
| 5,970,143 | A | 10/1999 | Schneier et al. | 713/181 |
| 5,980,384 | A | 11/1999 | Barrie | 463/16 |
| 5,999,808 | A | 12/1999 | LaDue | 455/412.2 |
| 6,001,016 | A | 12/1999 | Walker et al. | 463/42 |
| 6,012,983 | A | 1/2000 | Walker et al. | 463/20 |
| 6,024,640 | A | 2/2000 | Walker et al. | 463/17 |
| 6,050,895 | A | 4/2000 | Luciano, Jr. et al. | 463/7 |
| 6,077,163 | A | 6/2000 | Walker et al. | 463/26 |
| 6,139,430 | A | 10/2000 | Huard et al. | 463/16 |
| 6,146,270 | A | 11/2000 | Huard et al. | 463/12 |
| 6,168,522 | B1 | 1/2001 | Walker et al. | 463/25 |
| 6,193,606 | B1 | 2/2001 | Walker et al. | 463/20 |
| 6,203,428 | B1 | 3/2001 | Giobbi et al. | 463/16 |
| 6,234,900 | B1 | 5/2001 | Cumbers | 463/42 |
| 6,244,957 | B1 | 6/2001 | Walker et al. | 463/20 |
| 6,273,820 | B1 | 8/2001 | Haste, III | 60/533 |
| 6,306,038 | B1 | 10/2001 | Graves et al. | |
| 6,315,662 | B1 | 11/2001 | Jorasch et al. | 463/20 |
| 6,318,721 | B1 | 11/2001 | Randall et al. | 273/148 |
| 6,319,127 | B1 | 11/2001 | Walker et al. | 463/26 |
| 6,331,144 | B1 | 12/2001 | Walker et al. | 463/20 |
| 6,336,636 | B1 | 1/2002 | Smart | |
| 6,024,643 | A1 | 2/2002 | Begis | 60/533 |
| 6,343,989 | B1 | 2/2002 | Wood et al. | 463/23 |
| 6,389,538 | B1 | 5/2002 | Gruse et al. | 705/1 |
| 6,394,899 | B1 | 5/2002 | Walker | |
| 6,402,148 | B1 | 6/2002 | Saruwatari | 273/292 |
| 6,402,614 | B1 | 6/2002 | Schneier et al. | 463/17 |
| 6,508,709 | B1 | 1/2003 | Karmarkar | 463/42 |
| 6,508,710 | B1 | 1/2003 | Paravia et al. | 463/42 |
| 6,527,638 | B1 | 3/2003 | Walker et al. | 463/25 |
| 6,565,434 | B1 | 5/2003 | Acres | |
| 6,578,735 | B1 | 6/2003 | Mothwurf | |
| 6,605,001 | B1 | 8/2003 | Tarantino | 463/22 |
| 6,634,942 | B2 | 10/2003 | Walker et al. | 463/20 |
| 6,695,700 | B2 | 2/2004 | Walker et al. | |
| 6,709,331 | B2 | 3/2004 | Berman | 463/16 |
| 6,712,695 | B2 | 3/2004 | Mothwurf et al. | |
| 6,722,983 | B2 | 4/2004 | Kaminkow et al. | 463/26 |
| 6,726,563 | B1 | 4/2004 | Baerlocher et al. | 463/25 |
| 6,733,389 | B2 | 5/2004 | Webb et al. | 463/20 |
| 6,769,983 | B2 | 8/2004 | Slomiany | 463/16 |
| 6,830,514 | B2 * | 12/2004 | Meyer et al. | 463/17 |
| 6,896,616 | B2 | 5/2005 | Weiss | 463/20 |
| 6,935,949 | B1 | 8/2005 | Murphy | 463/20 |
| 6,969,317 | B2 | 11/2005 | Walker et al. | 463/40 |
| 7,008,317 | B2 | 3/2006 | Cote et al. | 463/16 |
| 7,140,964 | B2 | 11/2006 | Walker et al. | 463/25 |
| 7,156,739 | B2 | 1/2007 | Walker et al. | |
| 7,210,141 | B1 | 4/2007 | Nathan et al. | |
| 7,503,851 | B2 | 3/2009 | Walker et al. | |
| 7,798,895 | B2 * | 9/2010 | Jubinville et al. | 463/18 |
| 7,887,414 | B2 | 2/2011 | Walker et al. | |
| 7,914,374 | B2 | 3/2011 | Walker et al. | |
| 2002/0022512 | A1 | 2/2002 | Higurashi | 463/20 |
| 2002/0037760 | A1 * | 3/2002 | Kawamura et al. | 463/6 |
| 2002/0058542 | A1 | 5/2002 | Roethel et al. | 463/13 |
| 2002/0082775 | A1 | 6/2002 | Meadows et al. | 701/214 |
| 2002/0090986 | A1 | 7/2002 | Cote et al. | 463/16 |
| 2002/0112171 | A1 | 8/2002 | Ginter et al. | 713/194 |
| 2002/0143875 | A1 | 10/2002 | Ratcliff, III | 709/205 |
| 2002/0155875 | A1 | 10/2002 | Levitan | 463/17 |

| | | | | |
|---|---|---|---|---|
| 2003/0028480 | A1 | 2/2003 | Rowe | 206/459 |
| 2003/0144053 | A1 | 7/2003 | Michaelson | 463/25 |
| 2003/0162582 | A1 | 8/2003 | Gordon | 463/20 |
| 2003/0224854 | A1 | 12/2003 | Joao | 463/40 |
| 2005/0014553 | A1 | 1/2005 | Byrne | 463/18 |
| 2006/0040730 | A1 | 2/2006 | Walker et al. | |
| 2006/0074504 | A1 * | 4/2006 | Maul | 700/91 |

FOREIGN PATENT DOCUMENTS

| | | | |
|---|---|---|---|
| EP | 0 405 776 | A2 | 1/1991 |
| EP | 0 478 412 | A1 | 4/1992 |
| EP | 0 487 446 | A2 | 5/1992 |
| FR | 2 697 653 | A1 | 5/1994 |
| FR | 2 815 214 | | 4/2002 |
| GB | 2 121 569 | A | 12/1983 |
| GB | 2 148 135 | A | 5/1985 |
| JP | 01258178 | A | 10/1989 |
| JP | 01269158 | A | 10/1989 |
| JP | 01269164 | A | 10/1989 |
| JP | 01316869 | A | 12/1989 |
| JP | 02110660 | A | 4/1990 |
| JP | 03269763 | | 12/1991 |
| JP | 06-35944 | | 2/1994 |
| WO | WO 86/02752 | | 5/1986 |
| WO | WO 92/16914 | | 10/1992 |
| WO | WO 93/19428 | | 9/1993 |
| WO | WO 94/19906 | | 9/1994 |
| WO | WO 95/05876 | | 3/1995 |
| WO | WO 99/42964 | | 8/1999 |
| WO | WO 01/03786 | | 1/2001 |
| WO | WO 01/48712 | | 7/2001 |
| WO | WO 01/69551 | | 9/2001 |
| WO | WO 01/75824 | | 12/2001 |
| WO | WO 02/100494 | A1 | 12/2002 |
| WO | WO 03/017178 | A1 | 2/2003 |
| WO | WO 03/089086 | A1 | 10/2003 |
| WO | WO 03/089090 | A1 | 10/2003 |
| WO | WO 2004/014506 | A1 | 2/2004 |

OTHER PUBLICATIONS

"Harrah's Reno Uses Hybrid ISDN to Attract Customers", Viewtext, Mar. 1989, Vo. 10, No. 3, 2 pp.
"Agent Speaks Directly to the Customer on the Screen", ISND News, Mar. 1, 1989, vol. 2, No. 4, 2 pp.
Conniff, Michael, "Don't Bet Against Harrah's When it Comes to ISDN", Electronic Service Update, May 1, 1989, 3 pp.
Website: "Bingo Network Gaming International", Network Gaming International Corp.—Bingo-Links, (http//network-bingo com/bingo htm), Nov. 13, 1996, 5 pp.
Ritchie, Lauren, "Orange Man Sought in Betting Probe", Orlando Sentinel Tribune, May 30, 1990, Section: Local & State, 3 pp.
Brochure: "Oasis Electronic Pull-Tab Network", Copyright 1993, Infinational Technologies, Inc., 9 pp.
"Interactive Network (IN) announced Tues . . . ", Communications Daily, Nov. 30, 1994, vol. 14, No. 230, 1 pg.
"Interactive Network Sets Up Gaming Subsidiary", Interactive Facts, Dec. 1994, vol. 1, No. 25, 2 pp.
"Interactive Network Launches Wagering Unit", Multimedia Business Report, Dec. 2, 1994, 1 pg.
"Interactive Network Forms Real-Time Gambling Subsidiary", Newsbyte News Network, Dec. 7, 1994, 2 pp.
Mayo, Michael, "Win-Or-Lose Cruise", Sun Sentinel, Dec. 28, 1994, Section: Sports, 3 pp.
Dvorak, John C., "Gambling on a PC near you.", PC Magazine, May 16, 1995, vol. 14, No. 9, p. 89, 1 pg.
"TLC: The Secret World of Gambling: Casino Surveillance", Copyright 2000, The Discovery Channel, (http // www tlc discover com/tlcpages/gambling/eyesky thml), 2 pp.
"Mimio™ Turns a Dry Erase Board into an Electronic Whiteboard", Dukane Corporation Audio Visual Division, [retrieved in 2002], no URL available, 1 pg.
Goosnes, Michael, "Laser Beam and Transpatent Senors", (http // atlas web ern ch atlas TP NEW HTML/tp9new/node253 html) 3 pp.
Website, "Extending the Casino Floor", Game Cast Live, (http // www gamecastlive com/presentation/toronto_files/slide0012 htm), download date: Jun. 6, 2001, 10 pp.
"Station Announces Formation of GameCase Live, LLC and Release of Remote Play eSlots for In-Room Gaming Applications", PR Newswire, Jun. 6, 2001, Section: Financial News, 2 pp.
Grochowski, John, "Computers Help Learn Winning Strategy", Chicago Sun-Times, Jun. 30, 1995, Section Weekend Plus, Gaming, p. 13, NC, 2 pp.
Pledger, Marcia, "Going for the Gold at Slot Tournaments", Las Vegas Review-Journal Dec. 24, 1995, p. 5.L., 4 pp.
Hawley, David, "Those One-Armed Bandits; Slot Machine Tournaments Lure Throngs to Midwest Casinos", The Houston Chronicle, Apr. 9, 1996, Section: Houston, p. 3.
Grochowski, John, "Slot Tourney Prospers Under Indiana Rules", Chicago Sun-Times, Apr. 6, 1997, Section: SHO, CASINOS, p. 15, NC., 1 pg.
Email: "We Have Added a New 'Auto-Spin' Feature . . . ", slotmachine@searchout com, (http // www searchout com), Sep. 17, 1999, 1 pg.
Website: "Bingo—Network Gaming International:", Network Gaming International Corp., (http // network-bingo com/bingo htm), download date: Nov. 13, 1996, 5 pp.
Brochure: "Oasis Electronic Pull-Tab Network", Copyright 1993 Infinational Technologies, Inc., 9 pp.
Office Action for U.S. Appl. No. 10/635,986, dated Feb. 29, 2008, 9 pp.
Office Action for U.S. Appl. No. 11/424,000, dated Sep. 21, 2007, 4 pp.
Notice of Allowability for U.S. Appl. No. 11/424,000, dated Feb. 20, 2008, 3 pp.
Notice of Allowability for U.S. Appl. No. 11/424,000, dated Jun. 16, 2008, 4 pp.
Office Action for U.S. Appl. No. 11/424,006, dated Apr. 14, 2008, 5 pp.
Office Action for U.S. Appl. No. 09/879,299, dated Aug. 29, 2001, 6 pp.
Interview Summary for U.S. Appl. No. 09/879,299, dated Sep. 11, 2001, 2 pp.
Interview Summary for U.S. Appl. No. 09/879,299, dated Sep. 14, 2001, 3 pp.
Office Action for U.S. Appl. No. 09/879,299, dated Apr. 23, 2002, 5 pp.
Notice of Allowability U.S. Appl. No. 09/879,299, dated Jun. 13, 2002, 3 pp.
Notice of Allowability for U.S. Appl. No. 09/879,299, dated Aug. 14, 2002. 3 pp.
Notice of Allowability for U.S. Appl. No. 09/879,299, dated Apr. 23, 2003, 2 pp.
Office Action for U.S. Appl. No. 10/159,722, dated Sep. 24, 2002, 5 pp.
Interview Summary for U.S. Appl. No. 10/159,722, dated Nov. 20, 2002, 3 pp.
Interview Summary for U.S. Appl. No. 10/159,722, dated Nov. 4, 2002, 4 pp.
Interview Summary for U.S. Appl. No. 10/159,722 dated Dec. 4, 2002, 3 pp.
Office Action for U.S. Appl. No. 10/159,722, dated Feb. 24, 2004, 8 pp.
Interview Summary for U.S. Appl. No. 10/159,722, dated May 6, 2004, 3 pp.
Notice of Allowability for U.S. Appl. No. 10/159,722, dated Nov. 30, 2004, 4 pp.
Notice of Allowability for U.S. Appl. No. 10/159,722, dated Jul. 28, 2005, 4 pp.
Office Action for U.S. Appl. No. 11/217,588, dated Jan. 12, 2007, 14 pp.
Office Action for U.S. Appl. No. 11/217,588, dated Sep. 26, 2007, 11 pp.
Notice of Allowability for U.S. Appl. No. 11/217,588, dated Nov. 19, 2007, 2 pp.
Notice of Allowability for U.S. Appl. No. 11/217,588, dated Jun. 13, 2008, 2 pp.
Office Action for U.S. Appl. No. 08/774,487, dated Dec. 22, 1998, 6 pp.

Notice of Allowability for U.S. Appl. No. 08/774,487, dated Jul. 19, 1999, 1 pg.
Office Action for U.S. Appl. No. 09/437,204, dated Jun. 21, 2000, 8 pp.
Notice of Allowability for U.S. Appl. No. 09/437,204, dated Jan. 29, 2001, 3 pp.
Office Action for U.S. Appl. No. 10/636,520, dated Oct. 9, 2007, 10 pp.
Office Action for U.S. Appl. No. 11/423,037, dated Jan. 25, 2008, 6 pp.
Office Action for U.S. Appl. No. 11/423,037, dated Jun. 20, 2007, 8 pp.
Office Action for U.S. Appl. No. 11/423,043, dated May 28, 2008, 6 pp.
Office Action for U.S. Appl. No. 10/331,438, dated May 3, 2006, 6 pp.
Office Action for U.S. Appl. No. 10/331,438, dated Jun. 20, 2006, 6 pp.
Office Action for U.S. Appl. No. 10/331,438, dated Apr. 4, 2007, 14 pp.
Office Action for U.S. Appl. No. 10/331,438, dated Dec. 21, 2007, 13 pp.
Office Action for U.S. Appl. No. 11/462,756, dated Mar. 25, 2008, 6 pp.
Office Action for U.S. Appl. No. 11/462,850, dated Mar. 14, 2008, 5 pp.
Office Action for U.S. Appl. No. 11/428,599, dated Apr. 17, 2007, 4 pp.
Office Action for U.S. Appl. No. 11/428,599, dated Dec. 20, 2007, 7 pp.
Office Action for U.S. Appl. No. 11/428,601, dated Apr. 20, 2007, 5 pp.
Office Action for U.S. Appl. No. 11/428,601, dated Jan. 8, 2008, 5 pp.
Office Action for U.S. Appl. 11/428,601, dated Apr. 28, 2008, 8 pp.
Office Action for U.S. Appl. No. 11/456,726, dated Jun. 6, 2008, 7 pp.
Office Action for U.S. Appl. No. 09/930,717, dated Sep. 23, 2002, 7 pp.
Interview Summary for U.S. Appl. No. 09/930,717, dated Dec. 13, 2002, 3 pp.
Office Action for U.S. Appl. No. 09/930,717, dated Jul. 16, 2003, 6 pp.
Interview Summary for U.S. Appl. No. 09/930,717, dated Oct. 7, 2003, 2 pp.
Office Action for U.S. Appl. No. 09/930,717, dated Mar. 31, 2004, 8 pp.
Interview Summary for U.S. Appl. No. 09/930,717, dated Aug. 2, 2004, 4 pp.
Office Action for U.S. Appl. No. 09/930,717, dated Sep. 23, 2004, 5pp.
Notice of Allowability for U.S. Appl. No. 09/930,717, dated Mar. 18, 2005, 6 pp.
Office Action for U.S. Appl. No. 08/880,838, Oct. 6, 1999, 4 pp.
Notice of Allowability for U.S. Appl. No. 08/880,838, dated Dec. 6, 1999, 1 pg.
Office Action for U.S. Appl. No. 09/518,760, dated May 9, 2001, 7pp.
Notice of Allowability for U.S. Appl. No. 09/518,760, dated Aug. 10, 2001, 1 pg.
Office Action for U.S. Appl. No. 10/420,066, dated Sep. 22, 2006, 11 pp.
Office Action for U.S. Appl. No. 10/420,066, dated Jul. 13, 2007, 12 pp.
Office Action for U.S. Appl. No. 10/001,089, dated Sep. 12, 2003, 9 pp.
Office Action for U.S. Appl. No. 10/001,089, dated Apr. 6, 2004, 11 pp.
Interview Summary for U.S. Appl. No. 10/001,089, dated Aug. 12, 2004, 4 pp.
Office Action for U.S. Appl. No. 10/001,089, dated Jul. 11, 2005, 23 pp.
Notice of Allowability for U.S. Appl. No. 10/001,089, dated Jun. 28, 2006, 7 pp.
Office Action for U.S. Appl. No. 10/985,131, dated Nov. 3, 2005, 4 pp.
U.S. Appl. No. 08/766,576, "Secure Improved Remote Gaming System", filed Dec. 6, 1996. 81 pp.
U.S. Appl. No. 09/218,258, entitled "System and Method for Automatically Initiating Game Play on an Electronic Gaming Device", filed Dec. 6, 1996, 35 pp.
The International Search Report for PCT Application No. PCT/US03/24789, dated Jan. 13, 2004, 7 pp.
The International Search Report for PCT Application No. PCT/US03/08540, dated Jun. 19, 2003, 5 pp.
Written Opinion for PCT Application No. PCT/US03/08540, dated Jan. 27, 2004, 5 pp.
International Preliminary Examination Report for PCT Application No. PCT/US03/08540, dated Sep. 13, 2004, 4 pp.
Supplementary European Search Report for EP 02 75 2846, dated Aug. 24, 2006, 2 pp.
The International Search Report for PCT Application No. PCT/US02/26202, dated Oct. 2, 2002, 7 pp.
Written Opinion for PCT Application No. PCT/US02/26202, dated Apr. 29, 2003, 6 pp.
International Preliminary Examination Report for Application No. PCT/US02/26202, dated Apr. 14, 2004, 4 pp.
The International Search Report for PCT Application No. PCT/US03/12271, dated Sep. 15, 2003, 8 pp.
The International Search Report for PCT Application No. PCT/US02/14231, dated Jul. 8, 2002, 7 pp.
Written Opinion for PCT Application No. PCT/US02/14231, Apr. 7, 2003, 4 pp.
International Preliminary Examination Report for PCT Application No. PCT/US02/14231, dated Dec. 1, 2003, 4 pp.
Notice of Allowance for U.S. Appl. No. 11/424,000, dated Aug. 8, 2008, 6 pp.
Office Action for U.S. Appl. No. 10/636,520, dated Jul. 9, 2008, 14 pp.
Office Action for U.S. Appl. No. 11/462,756, dated Jul. 9, 2008, 9 pp.
Office Action for U.S. Appl. No. 10/420,066, dated Jan. 8, 2008, 7 pp.
Notice of Allowance for U.S. Appl. No. 11/424,006 mailed Jun. 5, 2009, 6 pp.
Notice of Allowance for U.S. Appl. No. 11/424,009 mailed Oct. 17, 2008, 6 pp.
Office Action for U.S. Appl. No. 11/424,009 mailed Jan. 16, 2008, 9 pp.
Office Action for U.S. Appl. No. 11/424,009 mailed May 25, 2007, 7 pp.
Notice of Allowance for U.S. Appl. No. 11/422,817 mailed Mar. 31, 2010, 6 pp.
Office Action for U.S. Appl. No. 11/422,817 mailed Mar. 31, 2010, 9 pp.
Notice of Allowance for U.S. Appl. No. 11/422,821 mailed Mar. 31, 2010, 6 pp.
Office Action for U.S. Appl. No. 11/422,821 mailed Aug. 26, 2009, 21 pp.
Office Action for U.S. Appl. No. 11/422,822 mailed Sep. 17, 2008, 7 pp.
Notice of Allowance for U.S. Appl. No. 10/636,520 mailed Sep. 30, 2010, 8 pp.
Office Action for U.S. Appl. No. 10/636,520 mailed Nov. 18, 2009, 13 pp.
Office Action for U.S. Appl. No. 10/636,520 mailed Jan. 15, 2009, 11 pp.
Office Action for U.S. Appl. No. 11/423,037 mailed Dec. 9, 2008, 13 pp.
Notice of Allowance for U.S. Appl. No. 11/423,043 mailed Oct. 28, 2010, 7 pp.
Office Action for U.S. Appl. No. 11/423,043 mailed Dec. 21, 2009, 9 pp.
Office Action for U.S. Appl. No. 11/423,043 mailed Jul. 20, 2009, 6 pp.
Notice of Allowance for U.S. Appl. No. 11/423,055 mailed Feb. 2, 2012, 7 pp.
Notice of Allowance for U.S. Appl. No. 11/423,055 mailed Oct. 25, 2011, 8 pp.
Notice of Allowance for U.S. Appl. No. 11/423,055 mailed Apr. 11, 2011, 7 pp.

Notice of Allowance for U.S. Appl. No. 11/423,055 mailed Dec. 17, 2010, 4 pp.
Office Action for U.S. Appl. No. 11/423,055 mailed Aug. 4, 2010, 10 pp.
Office Action for U.S. Appl. No. 11/423,055 mailed Aug. 4, 2010, 16 pp.
Notice of Allowance for U.S. Appl. No. 11/428,601 mailed Jan. 28, 2010, 6 pp.
Office Action for U.S. Appl. No. 11/428,601 mailed Jul. 21, 2009, 13 pp.
Office Action for U.S. Appl. No. 11/428,601 mailed Oct. 29, 2008, 9 pp.
Office Action for U.S. Appl. No. 11/691,065 mailed Aug. 19, 2010, 11 pp.
Office Action for U.S. Appl. No. 11/691,065 mailed Apr. 27, 2010, 12 pp.
Office Action for U.S. Appl. No. 11/691,065 mailed Feb. 17, 2011, 4 pp.
Office Action for U.S. Appl. No. 11/691,065 mailed Sep. 2, 2010, 8 pp.
Notice of Allowance for U.S. Appl. No. 11/428,642 mailed Aug. 5, 2011, 8 pp.
Office Action for U.S. Appl. No. 11/428,642 mailed May 13, 2011, 13 pp.
Office Action for U.S. Appl. No. 11/428,642 mailed Oct. 6, 2010, 9 pp.
Office Action for U.S. Appl. No. 11/428,638 mailed Sep. 14, 2011, 11 pp.
Office Action for U.S. Appl. No. 11/428,638 mailed Mar. 16, 2011, 12 pp.
Office Action for U.S. Appl. No. 11/428,638 mailed Oct. 4, 2010, 12 pp.
Notice of Allowance for U.S. Appl. No. 10/420,066 mailed Mar. 18, 2011, 8 pp.
Office Action for U.S. Appl. No. 10/420,066 mailed Oct. 1, 2010, 11 pp.
Office Action for U.S. Appl. No. 10/420,066 mailed Oct. 17, 2008, 10 pp.
Office Action for U.S. Appl. No. 11/424,441 mailed Apr. 21, 2010, 7 pp.
Office Action for U.S. Appl. No. 11/424,435 mailed Feb. 2, 2010, 13 pp.
Office Action for U.S. Appl. No. 11/424,435 mailed Jan. 23, 2009, 7 pp.
Office Action for U.S. Appl. No. 11/424,430 mailed Apr. 15, 2010, 6 pp.
Office Action for U.S. Appl. No. 11/423,043 mailed Jul. 13, 2010, 7 pp.
International Search Report for PCT/US08/63933 mailed Sep. 11, 2008, 2 pp.
Written Opinion for PCT/US08/63933 mailed Sep. 11, 2008, 9 pp.
Notice of Allowance for U.S. Appl. No. 10/986,529, mailed Oct. 27, 2011, 6 pp.
Notice of Allowance for U.S. Appl. No. 10/986,529, mailed Jul. 22, 2011, 8 pp.
Office Action for U.S. Appl. No. 10/986,529, mailed Dec. 12, 2010, 8 pp.
Office Action for U.S. Appl. No. 10/986,529, mailed Feb. 2, 2009, 12 pp.
Office Action for U.S. Appl. No. 10/986,529, mailed Jun. 29, 2008, 11 pp.
Office Action for U.S. Appl. No. 10/986,529, mailed Oct. 9, 2007, 10 pp.
Notice of Allowance for U.S. Appl. No. 11/425,037, mailed Dec. 30, 2010, 5 pp.
Office Action for U.S. Appl. No. 11/425,037, dated Sep. 9, 2010, 12 pp.
Office Action for U.S. Appl. No. 11/425,037, dated Jun. 1, 2010, 10 pp.
Office Action for U.S. Appl. No. 11/425,037, dated Apr. 29, 2008, 10 pp.
Notice of Allowance for U.S. Appl. No. 11/462,877, mailed Apr. 18, 2011, 7 pp.
Office Action for U.S. Appl. No. 11/462,877, mailed Jan. 7, 2011, 6 pp.
Office Action for U.S. Appl. No. 11/462,877, mailed Jul. 9, 2010, 7 pp.
Office Action for U.S. Appl. No. 11/462,877, mailed Feb. 9, 2010, 8 pp.
Fallstrom, Bob "Symphony of Trees is sure to be a dazzling delight", Herald & Review, published Nov. 17, 1992, 5 pp.
Murray, Raphel, "Casinos Gamble On Direct Mail; Atlantic City Casinos; Retail; Industry Overview", Direct Marketing Magazine, Feb. 1992, vol. 54, No. 10, p. 32, ISSN: 0012-3188, 4 pp.
Parets, Robyn Taylor, "The Newer DEAL", International Gaming and Wagering Business, Apr. 1997, Sec. p. 27, ISSN: 8750-8222, 4 pp.
"TLC: The Secret World of Gambling; Casino Surveillance", Copyright 2000, The Discovery Channel, (http://www.tlc.discover.com/tlcpages/gambling/eyesky.thml), 2 pp.
"Mirnio™ Turns a Dry Erase Board into an Electronic Whiteboard", Dukane Corporation Audiop Visual Division, [retrieved in 2002], no URL available, 1 pg.
Goosnes, Michael, "Laser Beam and Transpatent Sensors", (http://atlas web ern ch atlas TP NEW HTML/tp9new/node253.html) 3 pp. Jan. 27, 1995.
Website, "Extending the Casino Floor", Game Cast Live, (http://www.gamecastlive.com/presentation/toronto_files/slide0012.htm), download date: Jun. 6, 2001, 10 pp.
Davy, K., "Big Ichigekil Pachi-Slot Taikouryku Universal Museum—Reader Review", Copyright 1995-2001, Game FAQs, 2 pp.

* cited by examiner

900

| | PLAYER IDENTIFIER 902 | PLAYER NAME 904 | PLAYER CONTACT INFORMATION 906 | PLAYER / MEMBER GROUP IDENTIFIER 1 908 | ... | PLAYER / MEMBER GROUP IDENTIFIER N 908-N |
|---|---|---|---|---|---|---|
| R900-1 | P-156789 | SUSAN JONES | 123 MAIN ST. TOWN, STATE | ABC-276543C | ... | WHN-189745S |
| R900-2 | P-156790 | THOMAS SMITH | TSMITH@ISP.NET | DEF-256906X | ... | N/A |
| R900-3 | P-156791 | MARGRET REED | C: (111) 555-4256 | CDE-737974B | ... | N/A |
| ... | ... | ... | ... | ... | | ... |
| R900-N | P-846367 | JOHN ANDREWS | JAND2@JOB.COM | XYZ-543210A | ... | N/A |

FIG. 9

1000

| | GROUP IDENTIFIER 1002 | GROUP NAME 1004 | GROUP LEADER PLAYER IDENTIFIER 1006 | MAXIMUM ALLOWABLE PLAYERS / MEMBERS 1008 | QUANTITY, CURRENTLY ACTIVE PLAYERS / MEMBERS 1010 |
|---|---|---|---|---|---|
| R1000-1 | ABC-276543C | THE FAB FIFTEEN | P-156789 | 15 | 11 |
| R1000-2 | DEF-256906X | LOCAL 2211 LOCOMOTIVES | P-156790 | NO MAXIMUM | 215 |
| | ooo | ooo | ooo | ooo | ooo |
| R1000-N | XYZ-543210A | METROPOLITAN FANATICS | P-489321 | 10 | 10 |

FIG. 10

1100

| | GROUP PLAY GAME IDENTIFIER 1102 | GROUP PLAY GAME NAME 1104 | GROUP PLAY GAME TYPE 1106 | GROUP PLAY GAME RULE 1 1108 | ... | GROUP PLAY GAME RULE N 1108-N |
|---|---|---|---|---|---|---|
| R1100-1 | GPG-001 | MID-DAY MONOPOLIZATION | COMPETITIVE | BUY AND TRADE PROPERTIES TO BUILD UP... | ... | COMPLETE PLAY HAVING ACQUIRED ALL UTILITIES... |
| R1100-2 | GPG-002 | MATCH & WIN | COLLABORATIVE | COMPARE YOUR NUMBERS TO NUMBERS DRAWN... | ... | MATCH AT LEAST X DRAWN NUMBERS AMONG ALL... |
| | ... | ... | ... | ... | | ... |
| R1100-N | GPG-00N | PREDICT & WIN | COMPETITIVE COLLABORATIVE | PREDICT THE EXACT FINAL SCORE OF UP TO TEN... | ... | PREDICT POINTS SCORED BY A GIVEN PLAYER... |

FIG. 11

1200

| Row | GROUP PLAY GAME IDENTIFIER 1202 | GROUP PLAY PAYOUT CRITERIA 1 1204 | ... | GROUP PLAY PAYOUT CRITERIA N 1204-N | GROUP GAME PAYOUT 1 1206 | ... | GROUP GAME PAYOUT N 1206-N |
|---|---|---|---|---|---|---|---|
| R1200-1 | GPG-001 | COMPLETE PLAY WITH GREATEST TOTAL ASSETS (CASH + PROPERTY) | ... | COMPLETE PLAY HAVING ACQUIRED ALL UTILITIES | INDIVIDUAL BONUS ROUND ENTRY | ... | $5 PER PLAYER |
| R1200-2 | GPG-002 | RATIO OF TOTAL GROUP NUMBERS TO MATCHED NUMBERS < 3.5:1 | ... | TOTAL QUANTITY OF MATCHED NUMBERS > 40 AND GROUP SIZE ≤ 15 | $2 PER PLAYER | ... | $20 PER GROUP |
| | ... | ... | | ... | ... | | ... |
| R1200-N | GPG-00N | LOWEST DIFFERENTIAL BETWEEN ACTUAL AND PREDICTED SCORES | ... | SECOND LOWEST DIFFERENTIAL BETWEEN ACTUAL AND PREDICTED... | TOP PRIZE (PARI-MUTUEL) | ... | SECOND PRIZE (PARI-MUTUEL) |

FIG. 12

1300

GROUP IDENTIFIER: ABC-276543C 1302

GROUP PLAY GAME IDENTIFIER: GPG-002 ("MATCH & WIN") 1304

| | MEMBER TICKET IDENTIFIER 1306 | MEMBER TICKET INDICIA 1 1308 | ∘∘∘ | MEMBER TICKET INDICIA N 1308-N | MEMBER TICKET RESULT 1310 | MEMBER TICKET STATUS 1312 |
|---|---|---|---|---|---|---|
| R1300-1 | ABC-276543C-011 | 6 | ∘∘∘ | 48 | MATCH 2/6 | PENDING / UNREDEEMED |
| R1300-2 | ABC-276543C-012 | 3 | ∘∘∘ | 41 | MATCH 0/6 | CLOSED |
| R1300-3 | ABC-276543C-013 | 11 | ∘∘∘ | 52 | MATCH 1/6 | CLOSED |
| | ∘∘∘ | ∘∘∘ | | ∘∘∘ | ∘∘∘ | ∘∘∘ |
| R1300-N | ABC-276543C-N | 9 | ∘∘∘ | 50 | MATCH 4/6 | REDEEMED / CLOSED |

FIG. 13

GROUP PLAY OF A LOTTERY GAME

CROSS-REFERENCE TO RELATED APPLICATIONS

This application claims the benefit of priority of PCT Application No. PCT/US08/63933 filed May 16, 2008, entitled GROUP PLAY OF A LOTTERY GAME, which is hereby incorporated by reference in its entirety.

PCT Application No. PCT/US08/63933 claims the benefit of priority of U.S. Provisional Patent Application No. 60/938,666, filed May 17, 2007, which is hereby incorporated by reference in its entirety.

FIELD OF THE INVENTION

The present disclosure relates to systems and methods for conducting group play of multiplayer lottery games.

BRIEF DESCRIPTION OF THE FIGURES

FIG. 9 is a tabular representation of an embodiment of a Player database;

FIG. 10 is a tabular representation of an embodiment of a Group database;

FIG. 11 is a tabular representation of an embodiment of a Group Play Games database;

FIG. 12 is a tabular representation of an embodiment of a Group Play Payout database; and FIG. 13 is a tabular representation of an embodiment of a Group Play Ticket Status database.

DETAILED DESCRIPTION

Figure 1:
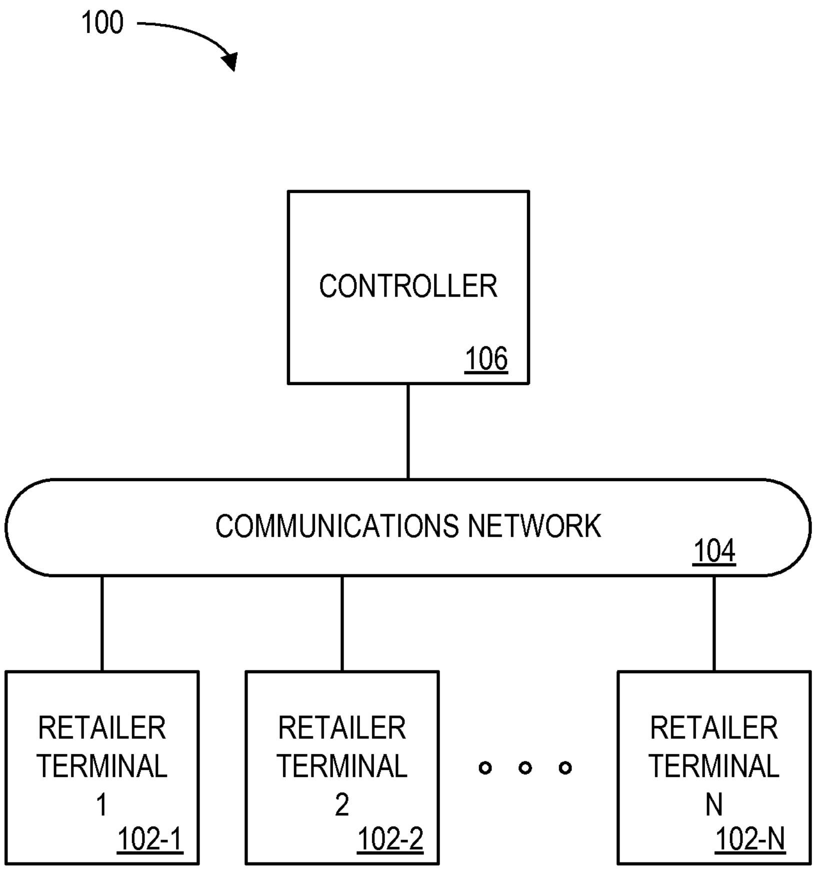
FIG. 1 illustrates an embodiment of a system or network environment including a plurality of lottery retailer terminals, a communications network, and a controller.

Many domestic and international jurisdictions currently offer some form of lottery game. Traditionally, such games may include instant lottery games (for example “scratch-off” games) and/or on-line lottery games (for example, periodic draw games such as 6/49 lotto, pick-3, Powerball™, and the like). Generally, jurisdictions operate lottery games to generate revenues which may be subsequently utilized by (or on behalf of) the lottery jurisdiction to fund general and/or specific civic initiatives (for example to provide capital for infrastructure improvements, funding for education initiatives, and the like). Given the societal benefits that lottery proceeds serve to fund, lottery operators have sought to maximize sales, and thus the overall return to their constituents. As a result, lottery operators are continually seeking new ways to expand and retain the overall population of lottery players.

It would thus be beneficial to provide systems and methods for conducting lottery games that differ from traditional lottery games (for example, the instant and/or periodic draw games mentioned above). A benefit of such an approach would be to appeal to certain players who might not otherwise view traditional lottery product offerings as compelling, valuable, and/or entertaining. Accordingly, this disclosure includes descriptions of various non-limiting embodiments that facilitate play of a lottery game with a team or group aspect. That is, group play, team play, and/or other type of multiplayer play of a lottery game are facilitated in accordance with the processes and systems disclosed herein. A plurality of players may be regarded as or associated as a team (in competition with another team), or as a group (in competition with another group or team), and may play a lottery game to win prizes (e.g. cash and/or merchandise prizes) as described below.

A lottery ticket may be defined as a voucher or ticket that contains one or more lottery entries which are eligible to be redeemed for a lottery payout or prize. For example, a traditional lottery ticket includes a set of numbers that may, in whole or in part, match a set of winning numbers that have been drawn at random by a lottery operator. An “instant win” or “scratch” ticket is a winning lottery ticket if it contains matching symbols, instant win symbols, or any markings indicating that it is a winning ticket, according to the rules of the game embodied by that lottery ticket.

A newly purchased lottery ticket has a redemption value that is unknown to a customer at the time of purchase. The lottery ticket may be of the type requiring a drawing, in which a customer may choose a set of numbers that he thinks will match with a set of numbers drawn at a later date. Alternately (or in addition), the lottery ticket may comprise an “instant win” or “scratch” type lottery entry, in which a winning or losing result can be determined immediately after purchase.

A lottery retailer may be defined as a merchant who sells lottery tickets at a particular location, verifies and/or authenticates winning lottery tickets, and redeems authenticated winning tickets for an eligible prize. In some embodiments, the lottery retailer also facilitates activation of a team or group lottery game by accepting entries from players, some of whom may be required to activate a lottery game for a group or for a team of players, as explained below. Examples of various lottery retailers include, but are not limited to, convenience stores, gas stations, and supermarkets.

Customers may also purchase and, in some cases, redeem lottery tickets at automated lottery terminals. An automated lottery terminal is an electronic device that may be capable of automatically reading some or all of the information located on (or otherwise embodied by) a lottery ticket (for example, sense and translate mark information selected by customer with a #2 pencil on a lottery entry form, read a bar code, read a ticket identifier, and the like). Such a device may also be used (either alone or in combination with another device, such as a controller) to determine the validity and redemption value, for example, of a lottery ticket, as well as to sell and print new lottery tickets. As will be explained in more detail below, an automated lottery terminal may be connected via a communications network to a lottery controller.

1. Lottery Communications Network

FIG. 1 illustrates a system or network environment 100 that includes a plurality of lottery retailer terminals 102-1 to 102-N, a communications network 104 and a controller 106. Generally, any or all of the retailer terminals 102-1 to 102-N may operate to: (i) receive information associated with one or more lottery tickets including such data as: (a) ticket and/or lottery entry identifier(s), (b) entry indicia, and (c) redemption values (payout values); (ii) transmit any or all of the received information to the controller 106 via the communications network 104; and (iii) output information including such data as: (d) information defining lottery entries for individuals and/or groups and (e) information associated with one or more groups or teams and/or redemption values.

In general, each retailer terminal 102-1 to 102-N shown in FIG. 1 will correspond to (or be associated with) a particular lottery retailer. For example, retailer terminal 1 (102-1) of FIG. 1 may be associated with a first lottery retailer such as a convenience store, and retailer terminal 2 (102-2) of FIG. 1 may be associated with a second lottery retailer such as a supermarket. It should be understood that any number of lottery retailer terminals might be employed in a system 100, along with any number of corresponding controllers 106.

The controller 106 may operate to: (i) receive, determine and/or store information associated with one or more lottery tickets including such data as: (a) ticket/entry identifier(s) and (b) entry indicia; (ii) determine a redemption value (for example, a prize amount) associated with a lottery ticket; (iii) receive a redemption request associated with the lottery ticket; (iv) determine a time associated with the redemption request; and (v) transmit an indication of the redemption value to a lottery retailer terminal (for example, for output to a display accessible by a lottery player and/or by a lottery terminal operator).

The retailer terminal 102-1 of FIG. 1 may be configured to perform some or all of the functions of the controller 106. Thus, in some embodiments, the controller 106 and the lottery retailer terminal 102-1 (or another given retailer terminal and controller pairing) may be considered as the same "device".

Generally, as explained above, the communications network of FIG. 1 may include one or more local and/or wide-area network(s), proprietary and/or public network(s) (for example, the Internet) for facilitating two-way data communications between the retailer terminals 102-1 to 102-N and the controller 106. The lottery controller may communicate with lottery retailer terminals directly or indirectly, via a wired or wireless medium such as the Internet, via a local area network (LAN), via a wide area network (WAN), via an Ethernet, via a Token Ring, a telephone line, a cable line, a radio channel, an optical communications line, a satellite communications link, or via any appropriate communications means or combination of communications means. Any number and type of devices may be in communication with the lottery controller, and communication between the lottery retailer terminals and the lottery controller 106 may be direct or indirect, such as over the Internet through a Web site maintained by computer on a remote server, or over an online data network including commercial online service providers, bulletin board systems and the like. In some embodiments, the devices may communicate with one another over RF, cable TV, satellite links and the like. A variety of communications protocols may be part of any such communications system, including but not limited to: Ethernet (or IEEE 802.3), SAP, ATP, Bluetooth and TCP/IP.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server computer may not be necessary and/or preferred. For example, methods described herein may be practiced on a stand-alone device and/or a device in communication only with one or more other devices. In such an embodiment, any functions described as performed by the computer or data described as stored on the computer may instead be performed by or stored on one or more other devices.

2. Lottery Retailer Terminal

Figure 2:
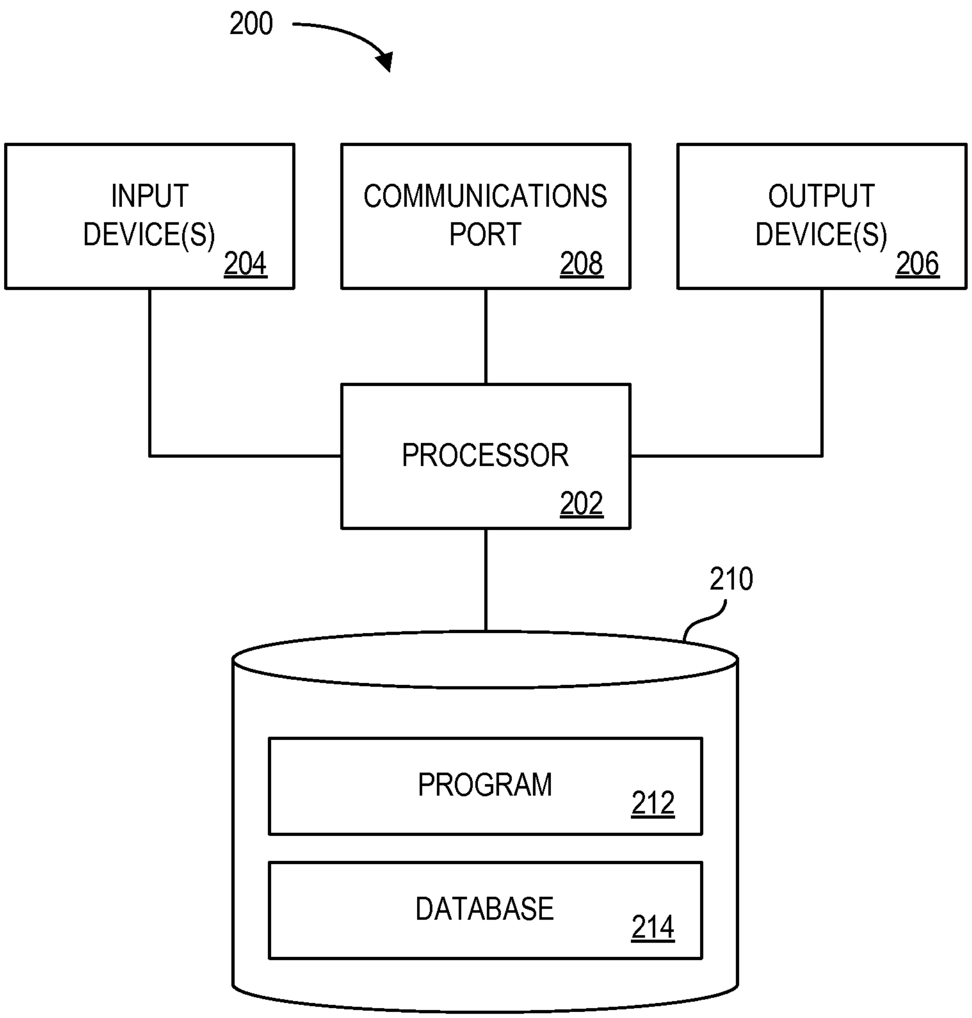
FIG. 2 is a simplified block diagram of an embodiment of exemplary components of a lottery retailer terminal.

FIG. 2 is a block diagram of some exemplary components of a lottery retailer terminal 200. The lottery retailer terminal 200 may include one or more processor(s) 202 such as the Intel® CORE 2 DUO™ processor, manufactured by INTEL Corporation, or other processors manufactured by other companies, such as the AMD Athlon 64™ processor manufactured by the Advance Micro Devices company. Generally, the processor is operative to perform or process instructions, and in particular, to operate in accordance with the various methods described herein. For example, the processor 202 may be operable to allow the lottery retailer terminal 200 to transmit data to (and receive data from) the controller 106 of FIG. 1. More specifically, the processor 202 may enable the transmission of data defining or identifying a lottery ticket or entry.

Accordingly, the lottery retailer terminal 200 may further include one or more input device(s) 204. The input devices may include components such as an optical scanner and/or a barcode scanner, for reading and/or for deriving information associated with a lottery entry. For example, a lottery ticket may include registration marks, authenticity data, various codes, micro-printed indicia, one or more sense marks, and/or other lottery indicia that must be read, for example, to distinguish between one or more lottery entries (which may all be contained on one lottery ticket, for example). Examples of additional input devices include, but are not limited to, a keypad, a mouse, an image capturing device (for example, an optical character recognition (OCR) device), a biometric reader, a portable storage device (for example, a memory stick), and the like.

According to some embodiments, the lottery retailer terminal input device(s) 204 may comprise or include a clock. The clock may be employed to detect, derive and/or append time and/or date information for use by the controller 106 to: (i) create a data record corresponding to lottery tickets or lottery entries purchased at the lottery retailer terminal 200, and/or (ii) to determine redemption time and/or date information associated with lottery tickets and/or lottery entries, and/or (iii) determine whether a lottery player has redeemed a lottery ticket that, for example, enables him to proceed to a second round of a lottery game. Details of specific processes concerning team or group lottery play and redemption of winning lottery tickets are presented in more detail below.

The lottery retailer terminal 200 of FIG. 2 may further include one or more output device(s) 206. Such output device(s) 206 may include such components as a display for outputting information to a lottery player and/or to a terminal operator (for example, aggregate performance information and/or payout amounts), one or more benefit output devices (for example, a cash drawer, a currency dispenser), a printer for producing a physical record (such as a paper slip, receipt, ticket, voucher, coupon, and the like) that defines a lottery ticket or lottery entry, an audio/video output device(s), and the like.

The lottery retailer terminal 200 may also include one or more communications port(s) 208, such as a serial port, modem or the like. Generally, the communications port 208 is operable to facilitate two-way data communications between the lottery retailer terminal 200 and the controller 106 shown in FIG. 1, but may be used to facilitate data communications between other devices as well. In some embodiments, the communications port 208 may facilitate the transmission of information between the lottery retailer terminal 200 and a player device such as a personal digital assistant (PDA), cell phone and/or a dedicated device (for example, a proprietary electronic and/or digital device).

The lottery retailer terminal 200 may further include a data storage device 210 such as a hard disk, optical or magnetic media, random access memory (RAM) and/or read-only memory (ROM), or the like memory device. Generally, the lottery retailer terminal data storage device 210 stores a software program, the software program enabling the processor 202 of the retailer terminal 200 to perform various functions including some or all of the various processes or steps described herein. For example, as noted above with respect to FIG. 1, the retailer terminal 200 can be configured to perform some or all of the functions of the controller (and vice versa) such that the controller 106 and the lottery retailer terminal 200 (or, referring to FIG. 1, a given lottery terminal and controller pairing) may be considered as the same "device". An example retailer terminal available in the marketplace and that may be adapted to perform various functions described herein is the EXTREMA® clerk-operated lottery terminal, distributed by Scientific Games Corporation of Alpharetta, Ga.

In some embodiments, a lottery sales device may be utilized in place of a lottery retailer terminal 200. Such a lottery sales device may be implemented as a system controller, a dedicated hardware circuit, an appropriately programmed general-purpose computer, or any other equivalent electronic, mechanical or electro-mechanical device. Thus, in various embodiments, a lottery sales device may comprise, for example, a Video Lottery Terminal (VLT) that may include a touch sensitive screen for use by a player, a personal computer (capable of communication with a remote lottery server), a vending machine, a telephone, or a portable handheld device (for example, a device similar to a personal digital assistant (PDA) or other analog or digital communications device). The lottery sales device may comprise any or all of the devices of the aforementioned systems. In some embodiments, a user device such as a PDA, cell phone, and/or portable gaming unit (e.g. the Playstation™ Portable (PSP™), distributed by Sony Corporation) may be used in place of, or in addition to, some or all of the device components.

3. Lottery Operator Controller

Figure 3:
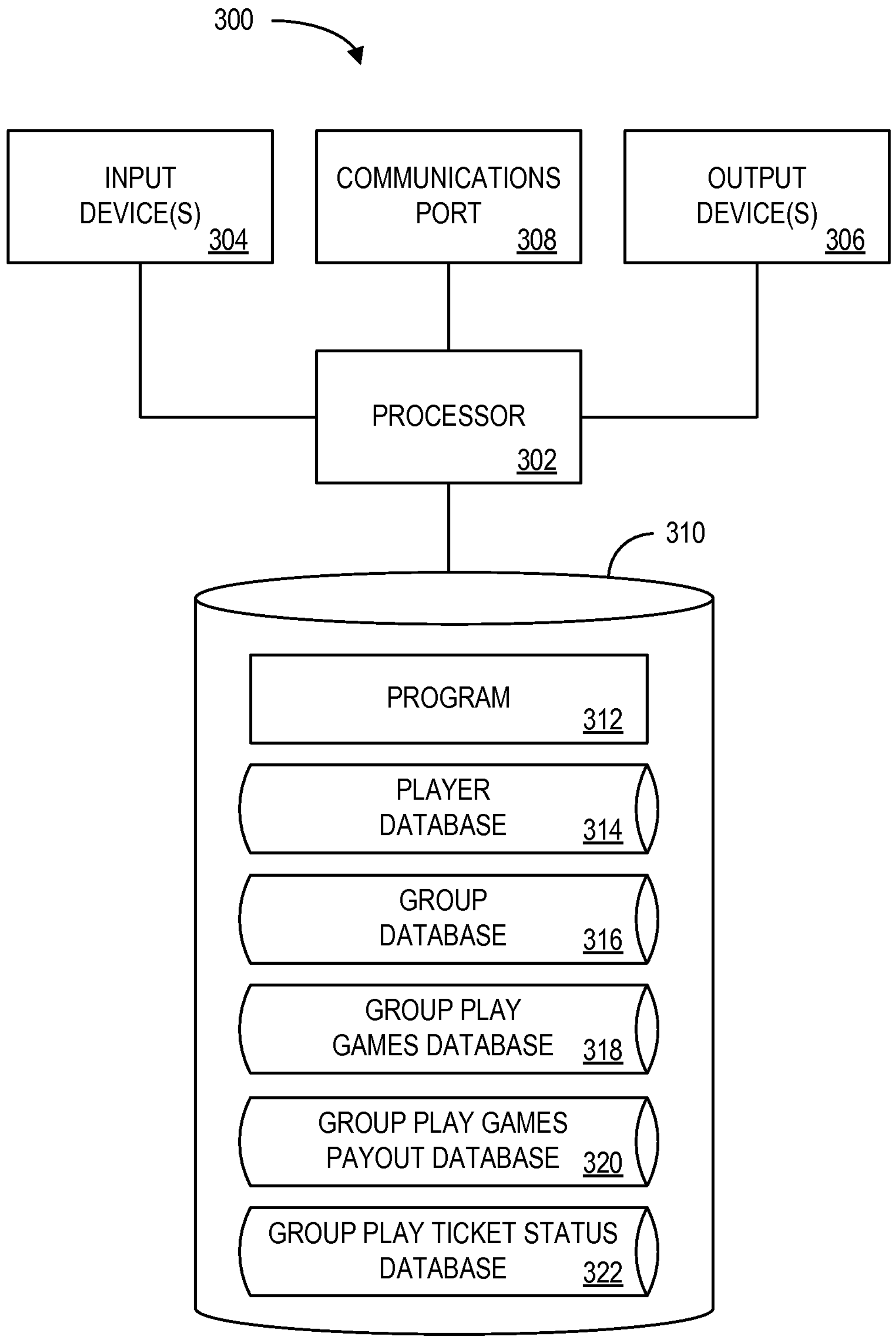
FIG. 3 is a simplified block diagram illustrating an embodiment of exemplary components of a lottery operator controller.

FIG. 3 is a block diagram illustrating an embodiment of the components of a lottery operator controller 300. Similar to the lottery retailer terminal 200 of FIG. 2, the lottery operator controller 300 may include one or more processors such as the Intel® CORE 2 DUO™ processor, manufactured by INTEL Corporation, or other processors manufactured by other companies, such as the AMD Athlon 64™ processor manufactured by the Advance Micro Devices company. Such a processor 302 functions to process instructions, and in particular, to operate in accordance with various methods described herein. For example, the processor 302 may operate to allow the lottery operator controller 300 to transmit data to (and receive data from) the lottery retailer terminal 200 shown in FIG. 2. More specifically, the controller processor 302 may enable the transmission of data defining or identifying a particular lottery ticket or entry, as well as information defining a payout or prize associated with that lottery ticket to a specific one of the lottery retailer terminals 102-1 to 102-N shown in the lottery network 100 of FIG. 1. Thus, the lottery operator controller 300 may be implemented as a system controller, a dedicated hardware circuit, an appropriately programmed general-purpose computer (for example, a lottery server), or any other equivalent electronic, mechanical or electro-mechanical device. In various embodiments, a lottery operator controller may comprise, for example, a personal computer (which communicates with a remote lottery sales terminal) or a mainframe computer.

The lottery operator controller 300 may further include one or more input device(s) 304. Examples of such input devices include a keypad, a mouse, a touch-screen, a random number generator, a microphone, and other digital or analog input devices. The lottery operator controller input device(s) 304 may comprise or include a clock. As described above, the clock may be employed to derive time and/or date information for use by the lottery controller 300 to generate a data record corresponding to lottery tickets or lottery entries purchased at the lottery retailer terminal 200, and/or to determine redemption time and/or date information associated with lottery tickets and/or lottery entries, and/or to determine whether a team or group of lottery players have purchased and/or redeemed one or more tickets.

The lottery operator controller 300 may further include one or more output device(s) 306. Examples of output devices 306 include a monitor or other display for outputting information to a user of the lottery operator controller (for example, for displaying information such as statistical or sales data, win and loss information and/or payout amounts), a printer for producing a physical record (for example, a report, a paper slip, a voucher, a coupon, a ticket) of such data, and the like. In addition, the lottery operator controller 300 may include one or more communications ports 308, such as a serial port, modem or the like, operable to facilitate two-way data communications between the operator controller 300 and one or more lottery retailer terminals 200, as described above with respect to FIGS. 1 and 2.

The lottery operator controller 300 may also include a data storage device 310 (such as a hard disk or hard drive, a media-based (removable) memory, or the like). The lottery operator controller data storage device 310 stores at least one software program 312, which includes a program to enable the processor 302 to perform some or all of the various steps and functions of at least one implementation of the methods described in detail herein. In addition, the lottery operator controller data storage device 310 may operate to store various databases, for example, a player database 314, a group database 316, a group play games database 318, a group play games payout database 320, and a group play ticket status database 322. The lottery player database 314 may include player identifier data and contact information, and data associated with one or more groups of players, which will be explained in detail below. The group database 316 may include group identifiers, group names, a group leader player identifier, and other information associated with one or more groups. The group play games database 318 may include a group play game identifier, group play game name, a group play game type, and game rules, for example. The group play games payout database 320 may include group play game identifiers, group play payout criteria, and group game payout information. The group play ticket status database 322 may include data of a particular group including a group identifier, a group play game identifier, group member ticket identifiers, group member ticket indicia, and group member ticket status.

The lottery operator controller may include a lottery ticket server device that is located at a lottery ticket printing facility, and may also function to manage the ticket printing process. The lottery operator controller may also function to facilitate organizing lottery players into teams or groups.

4. Multiplayer Lottery Game System

Figure 4:
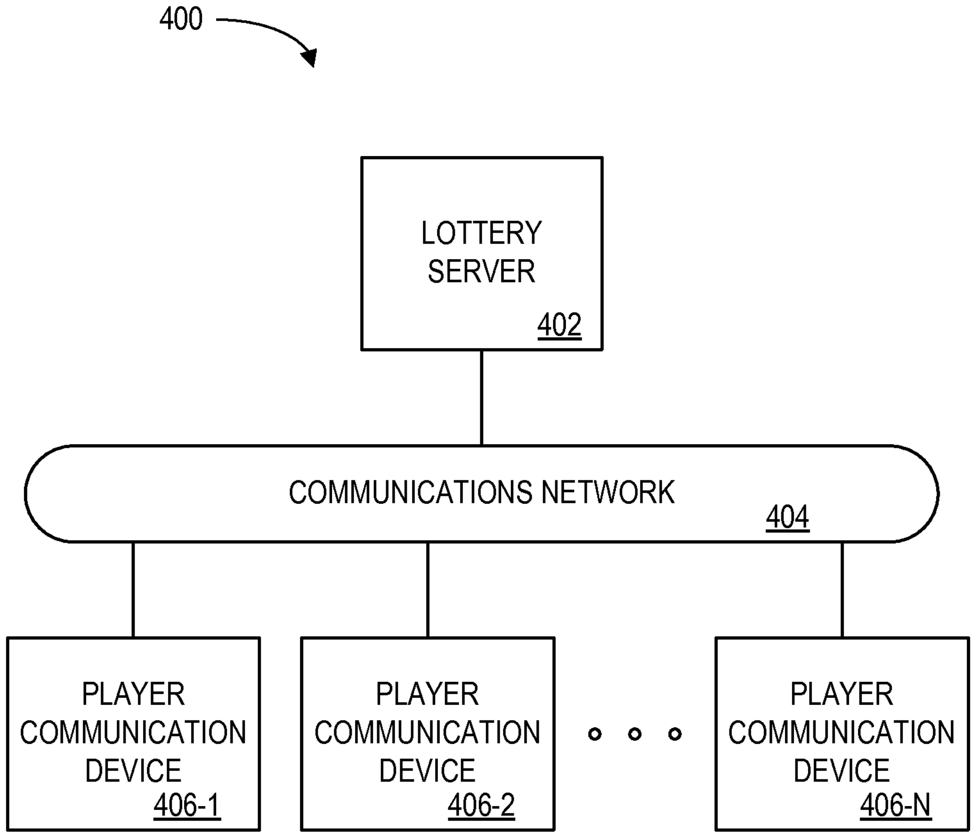
FIG. 4 is a simplified block diagram of an example of a lottery game system including a lottery server in communication with a plurality of player communication devices through a communications network.

FIG. 4 is a simplified block diagram of an example of a multiplayer lottery game system 400 that includes a lottery server 402 in communication with a plurality of player communication devices 406-1, 406-2 to 406-N through a communications network 404. The player communication devices 406-1 to 406-N may include such devices as pagers, personal computers, handheld display devices, personal digital assistants (PDA's), set-top display devices, cellular telephones that include a display, and/or proprietary digital communications devices. Such player communication devices could be used to submit required player information to the lottery server, provide sufficient information to permit the player to follow and enjoy multiplayer lottery game play, and/or in some cases to authorize necessary or desired changes in the lottery game play.

For example, a player communication device 406-1 may be used to communicate player identifying information and player selections to the lottery server 402. The lottery server 402 may comprise a computer device, such as a Web server, operated on behalf of or, in conjunction with, a lottery authority. The lottery server 402 operates, for example, to obtain information and to set up lottery game player groups, to determine lottery outcome data, and to communicate instructions and lottery information (that may include the lottery outcome data) to the player communication devices 406-1 to 406-N of players actively participating in the same lottery game.

Communications between the lottery server 402 and the player communication devices 406-1 to 406-N may be facilitated by way of a communications network 404, which may be a computer network such as the World Wide Web, the Internet, a local area network, postal mail, or any combination thereof. In accordance with the processes described herein, a plurality of player communication devices 406-1 to 406-N may be located remotely from the lottery server 402, for example, at a home of a player or at a lottery agent.

The lottery server 402 may comprise any computing device operable to administer lottery games in accordance with the methods described herein. Thus, the lottery server 402 may be configured in a manner similar to the lottery operator controller 300 described above with reference to FIG. 3. In particular, the lottery server 402 preferably includes a Central Processing Unit (CPU) that includes a clock associated therewith, and operates to execute instructions of a program stored in memory (e.g. Read Only Memory (ROM)). During execution of the program instructions, the CPU temporarily stores information in the Random Access Memory (RAM). In addition, the CPU may be coupled to a data storage device (not shown) and/or transaction processor. The data storage device may include one or more of a player database, a group database, a group play games database, a group play games payout database, and a group play ticket status database. Other databases could also be stored for use by the transaction processor and/or the CPU. In general, the transaction processor may be utilized to manage the contents of the data storage device.

In order to communicate with the player communication devices 406-1-406-N, the lottery server 402 preferably includes a communication port (not shown). The communication port may be coupled to both the CPU and the data storage device. Thus, the CPU can control the communication port to receive information from the data storage device and to transmit the information to the player communication devices. Information may also be received from the player communication devices via the communication port. Note that the communication path between the communication port and the communication devices need not be hardwired. As noted above, the communication devices may include a personal computer, a pager, a handheld device including a display (for example, such as a PDA), or a cellular telephone, and some or all such devices may employ wireless communication components and/or protocols.

In addition, optionally in communication with the CPU of the Lottery Server 402 is a Random Number Generator (RNG) for providing random outcomes for the multiplayer lottery game play. Under control of a program stored, for example, in a storage device or in ROM, the CPU initiates the RNG to generate a random number that could be used to determine winning lottery outcomes. The CPU may also be responsive to, for example, a signal from the player communication device (for example, a player's personal computer).

5. Other Devices

In some embodiments, a kiosk (not shown) may be configured to execute or assist in the execution of various lottery game processes. A kiosk could comprise a processor and a storage device or memory as described above. A kiosk may also include various input devices (such as a keyboard, a mouse, buttons, an optical scanner for reading barcodes or other indicia, a CCD camera, and the like), output devices (like a display screen and/or audio speakers), benefit output devices (such as a coin tray and/or a currency dispenser), communications ports, and the like. A kiosk may be configured to communicate with a lottery controller or lottery server. In some embodiments, kiosks may execute or assist in the execution of various lottery functions, as described herein.

Lottery players may also use one or more computing devices to obtain more information about the lottery games, and/or the specific lottery game that the player is playing. For example, a player may utilize a personal computer to access a web site that contains group lottery game instructions, team lottery game round information, winning lottery entry payout information, aggregated group play information, and the like.

6. Exemplary Lottery Entries

Figure 5:
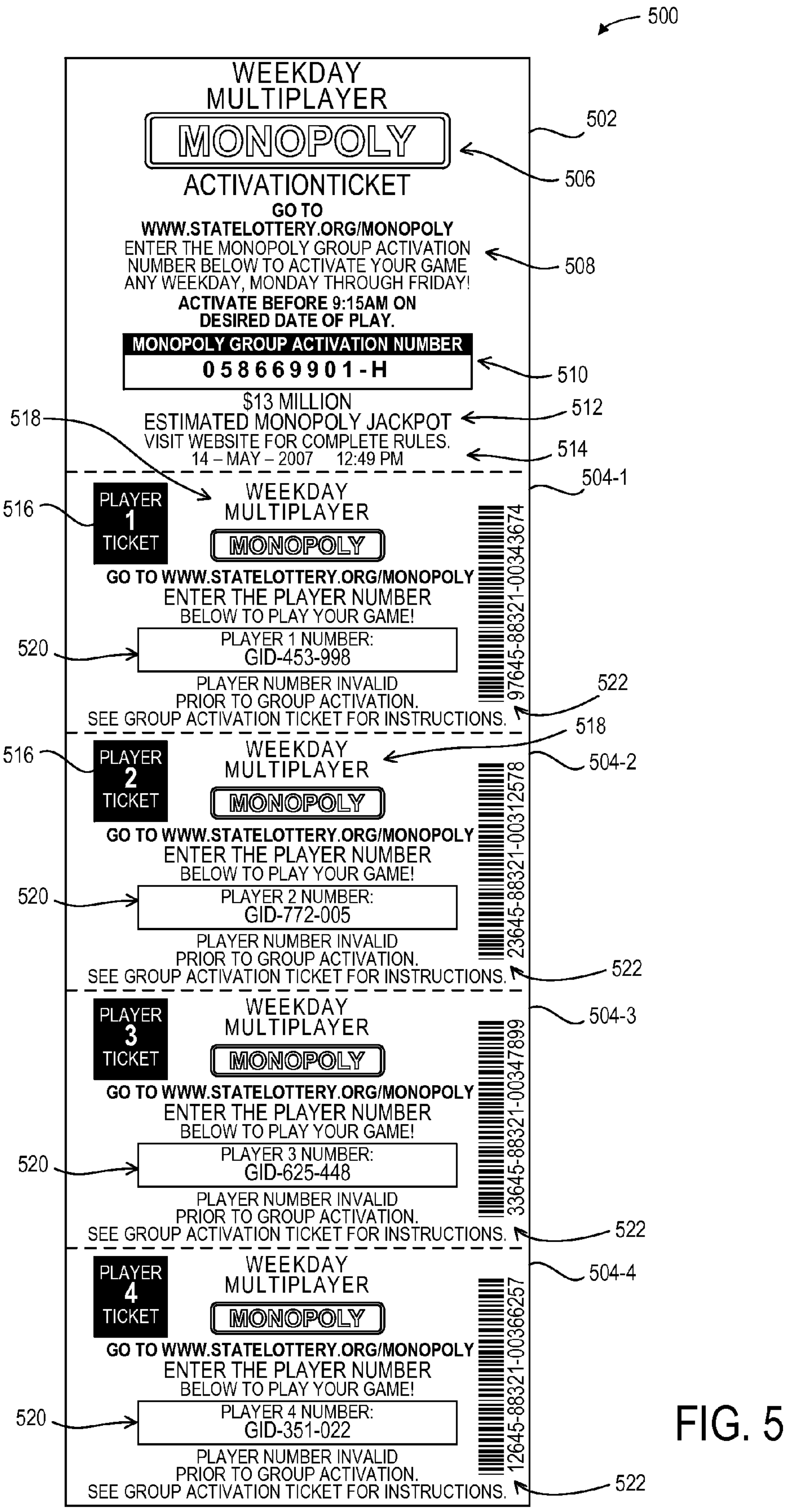
FIG. 5 is an exemplary embodiment of a multiplayer lottery game ticket for a plurality of players of a group according to the invention that includes an activation code portion and a plurality of player portions having player access codes.

FIG. 5 depicts an example of a multiplayer or group lottery game ticket 500 for a lottery game to be played by a group of players (or a team of players). This example of a group or multiplayer lottery game ticket 500 includes a group activation slip 502 (or other embodiment of an indicia) for the group itself, and four respective player portions 504-1, 504-2, 504-3 and 504-4 for each individual member (lottery player) of the group. The group activation slip 502 includes an indication of the lottery game 506, an instructions section 508, a group activation identifier 510 (which may be an alpha-numeric identifier), an indication of an estimate of the jackpot 512, and other information 514 (which may include lottery game rules, or an indication of where a player can find the rules) and/or a date and time of activation or purchase.

Each of the lottery game player slips 504-1 to 504-4 of this example includes a player ticket identifier 516, a lottery game description 518, a unique player identifier 520, a barcode and serial number 522, and may include other information such as lottery game rules and the like. The multiplayer or group lottery ticket 500 illustrated by FIG. 5 may be purchased at a lottery retailer, for example, and this particular example of a multiplayer lottery ticket accommodates up to four players. One skilled in the art will recognize that other group lottery game tickets could provide for more or less lottery game players, and could include more or less information as appropriate for a particular type of group lottery game. In addition, a group lottery ticket 500 may include one or more security features such as micro-printed portions, embedded security threads, and/or holograms, to prevent or deter counterfeiting of lottery tickets.

A lottery player may purchase such a lottery ticket at a retail location having a lottery retailer terminal 200 (see FIG. 2) configured to printed the group lottery game ticket 500 at the time of purchase. Thus, the lottery retailer terminal may include an integral printer device, or a printer may be a peripheral device or an output device 206 capable of printing group lottery game tickets. In addition, a lottery player may be permitted to purchase such tickets electronically using a player communication device (see FIG. 4) and also print them by using a personal printer device, such as a computer printer and the like, that is in communication with the player communication device. In some embodiments, the printer devices are capable of printing group lottery game ticket data that is capable of being scanned by various scanning devices such as bar code scanners and the like. Such devices may also be capable of printing security features on group lottery game tickets such as specific patterns, and/or micro-printed data, and/or designs and/or alpha-numeric codes, and the like.

It should be understood that, in some embodiments, a lottery game player purchases a group member lottery entry with a personal device, and thus may not be provided with a physical lottery ticket. Instead, an electronic version of the multiplayer lottery ticket or portions thereof may be provided to the player, for example, via electronic mail to an email account of the lottery player. Of course, the player could print out such an electronic version of the multiplayer lottery ticket, for example, by using a home computer and printer.

Figure 6A:
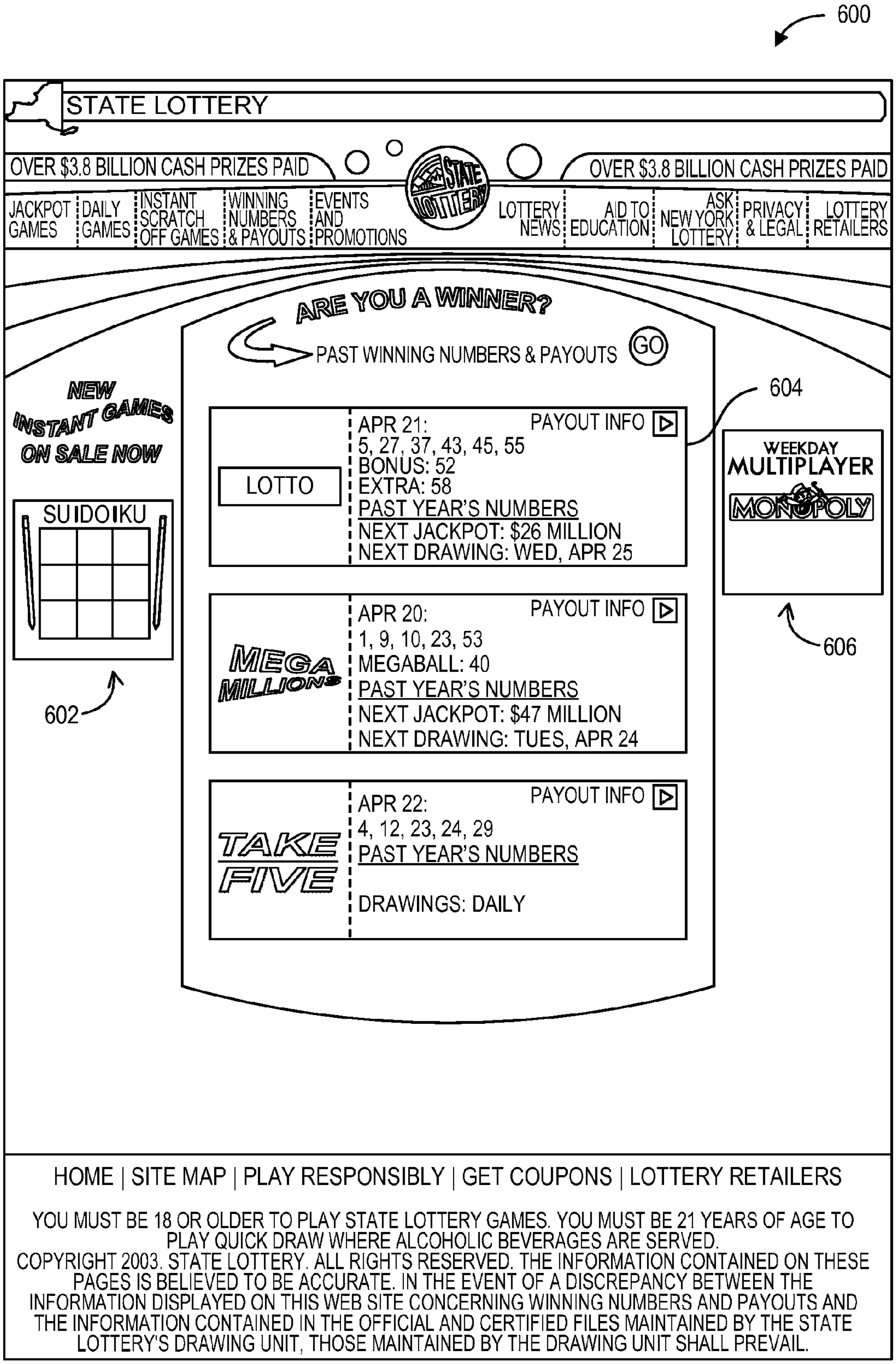
FIGS. 6A to 6G are examples representing various graphical user interfaces that may be accessed and utilized by lottery game players to perform various tasks associated with multiplayer lottery game play.
Figure 6B:
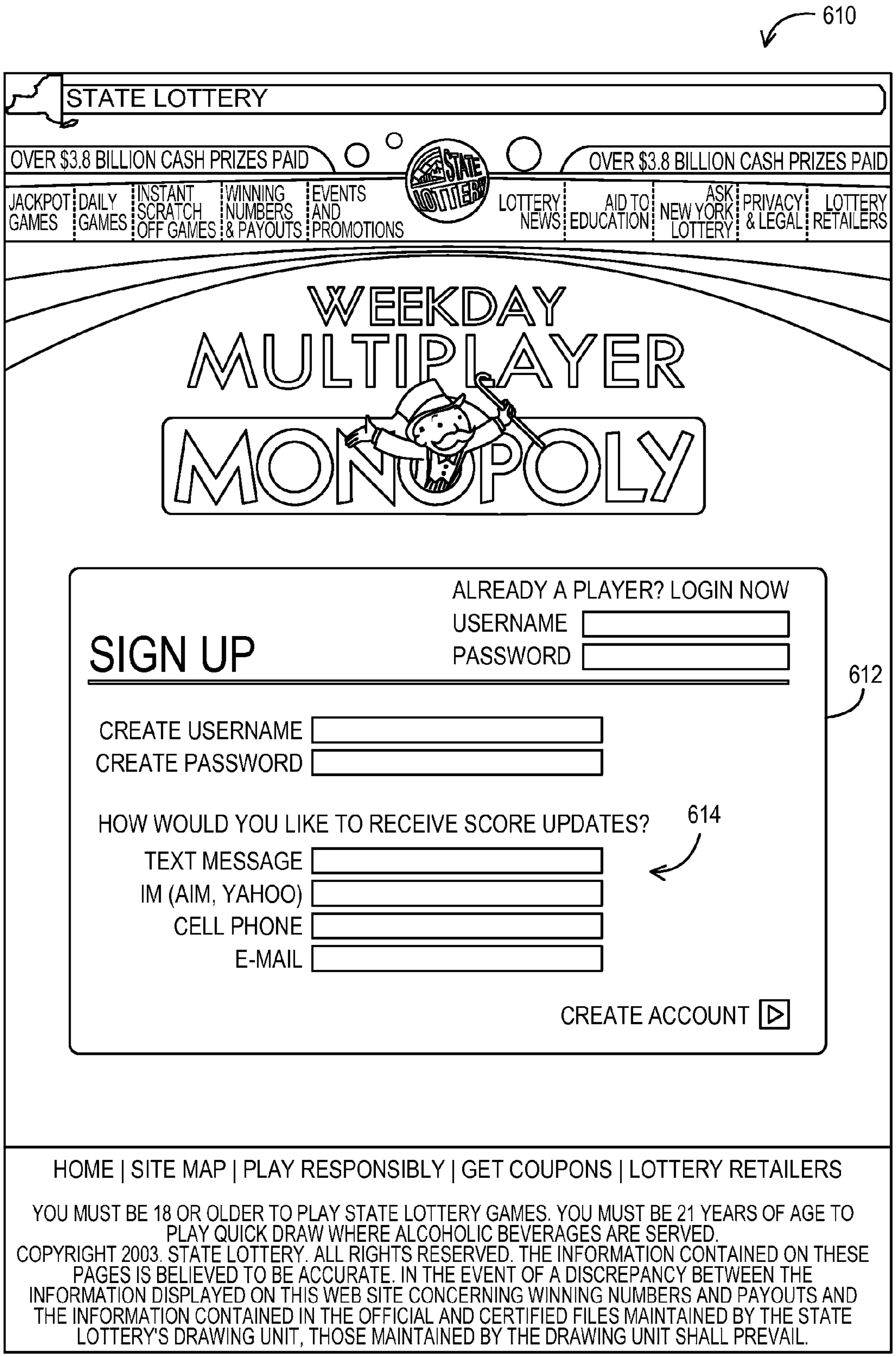
Figure 6C:
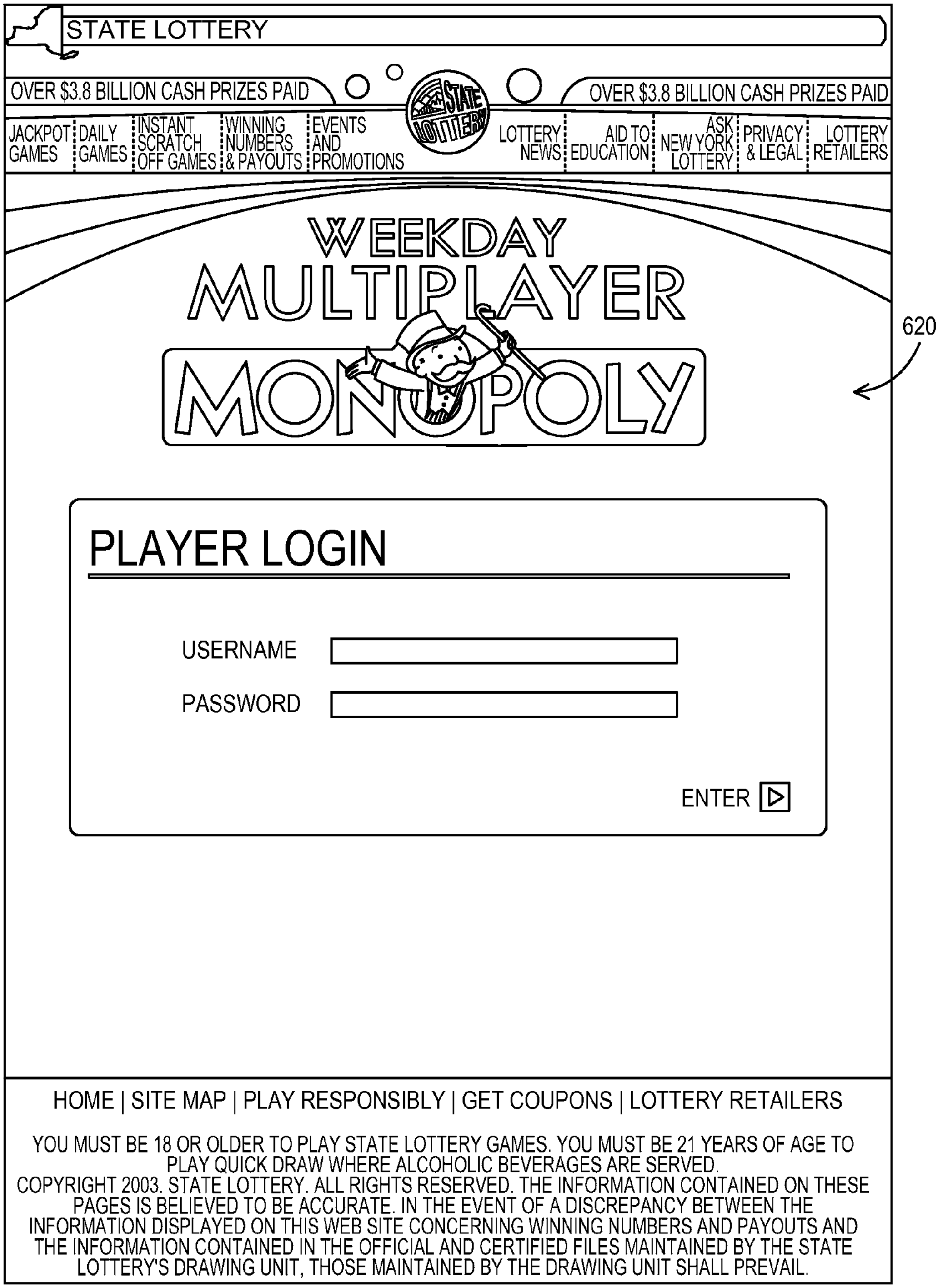

FIGS. 6A to 6G provide examples of web pages that may be accessed by lottery game players to purchase lottery game entries, to sign up for multiplayer lottery game play, to find lottery game information, to select a group of players, to customize lottery game aspects, and to track performance of multiplayer game play, and the like. In particular, FIG. 6A depicts an exemplary web page for a lottery game authority that includes links to information pertaining to instant/other games that are on sale 602, provides winning numbers and payout information 604 for lottery games that have had drawings completed, and a link 606 to a multiplayer lottery game called "Monopoly". If a lottery player clicks on the link to the multiplayer lottery game 606, then a sign up page 610 such as that shown in FIG. 6B may appear, which illustrates an exemplary sign up interface including a "Sign Up" box 612 that allows a player to create a user account and to indicate at least one preference 614 for receiving game information. If a player already has a user account and is playing a multiplayer lottery game, the player may be provided with a login interface 620 shown in FIG. 6C for use in accessing an online multiplayer game.

Figure 6D:
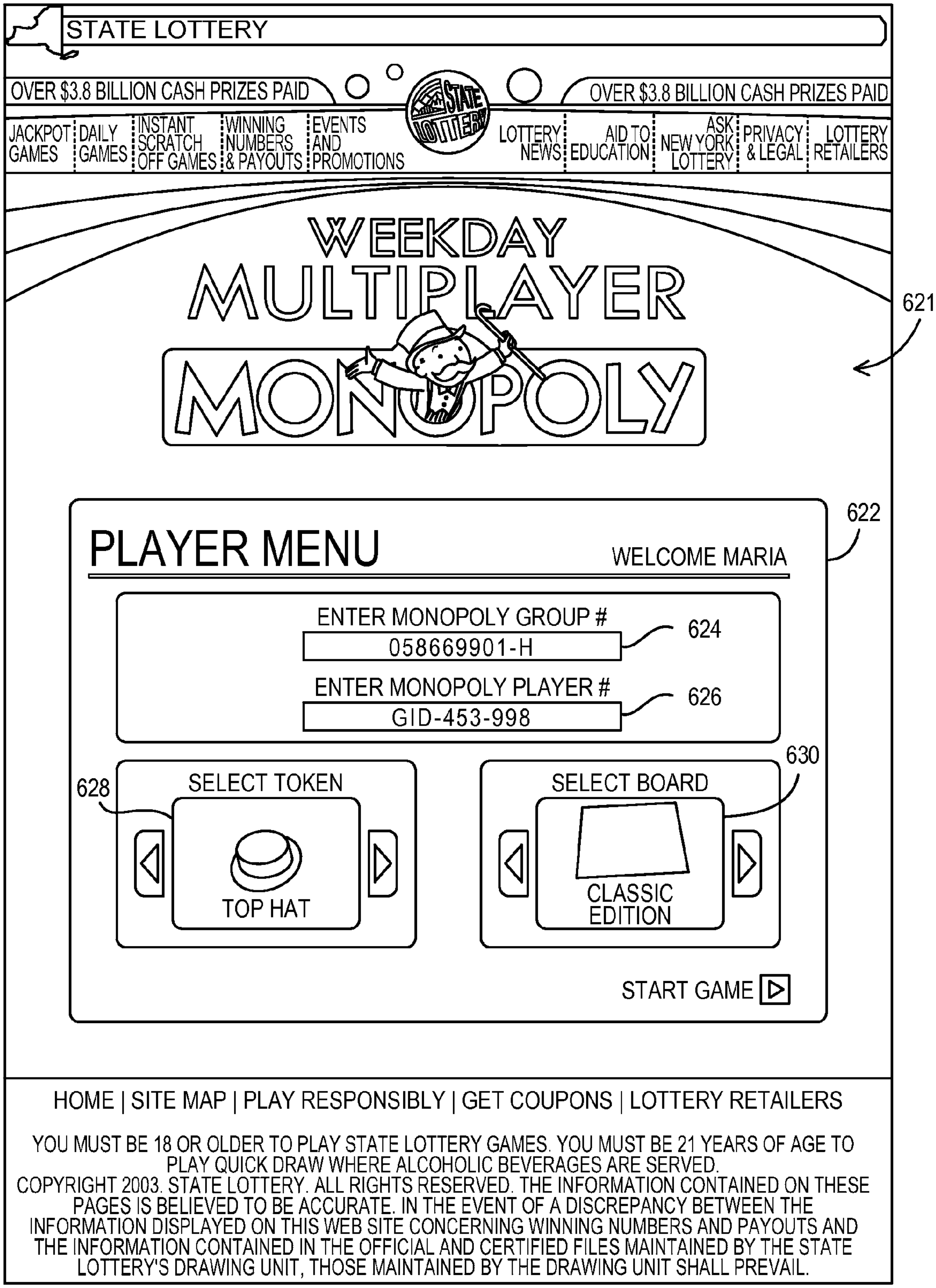

FIG. 6D depicts an exemplary interface 621 that includes a menu 622 that allows a player to input a group identifier 624 and player identifier 626, and to customize aspects of game play. To customize aspects of lottery game play, the player may be able to select a token or other icon (e.g. an avatar) representing the player from a selection menu 628 and/or a game board theme or design from a second selection menu 630.

Figure 6E:
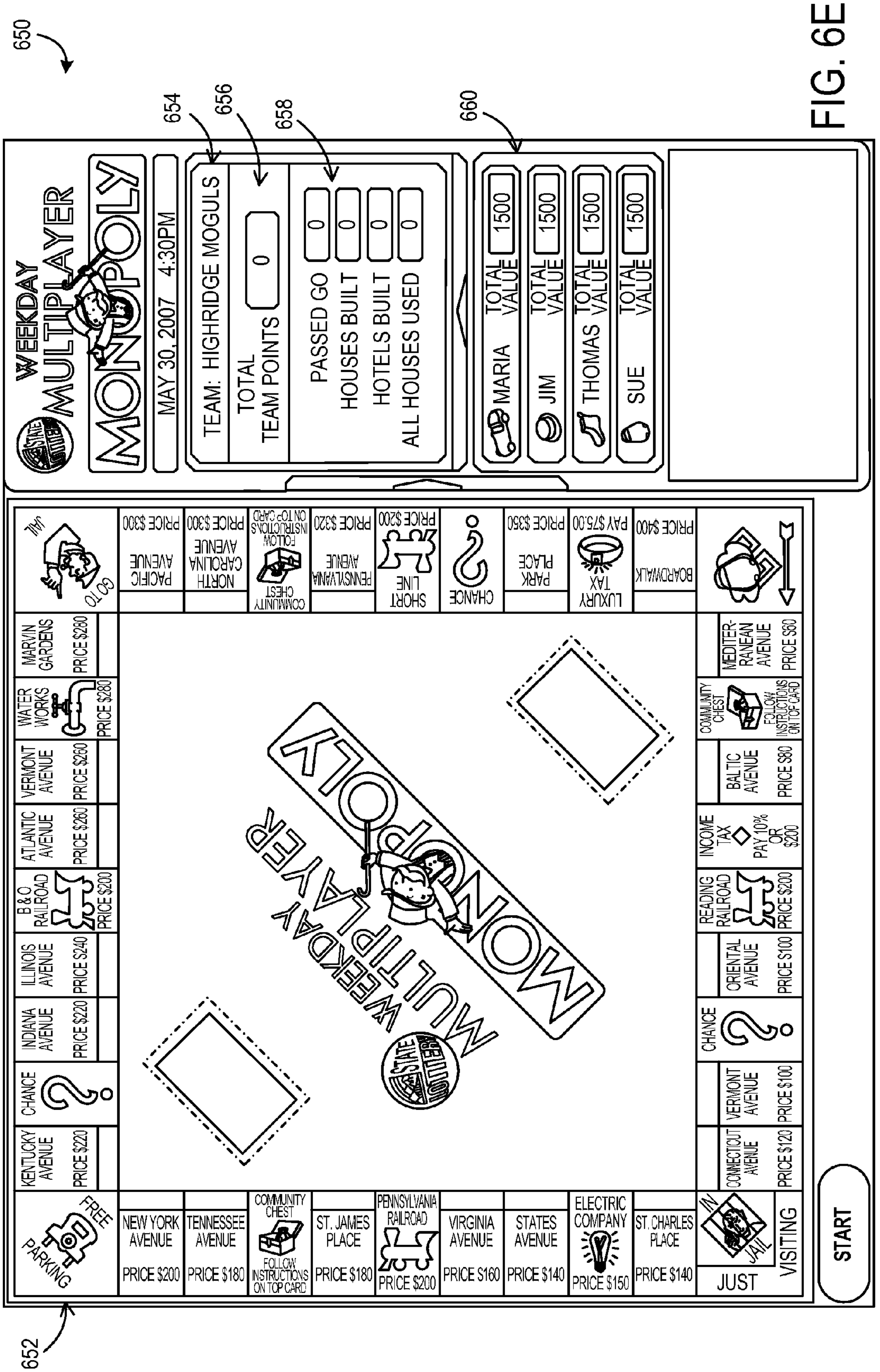
Figure 6F:
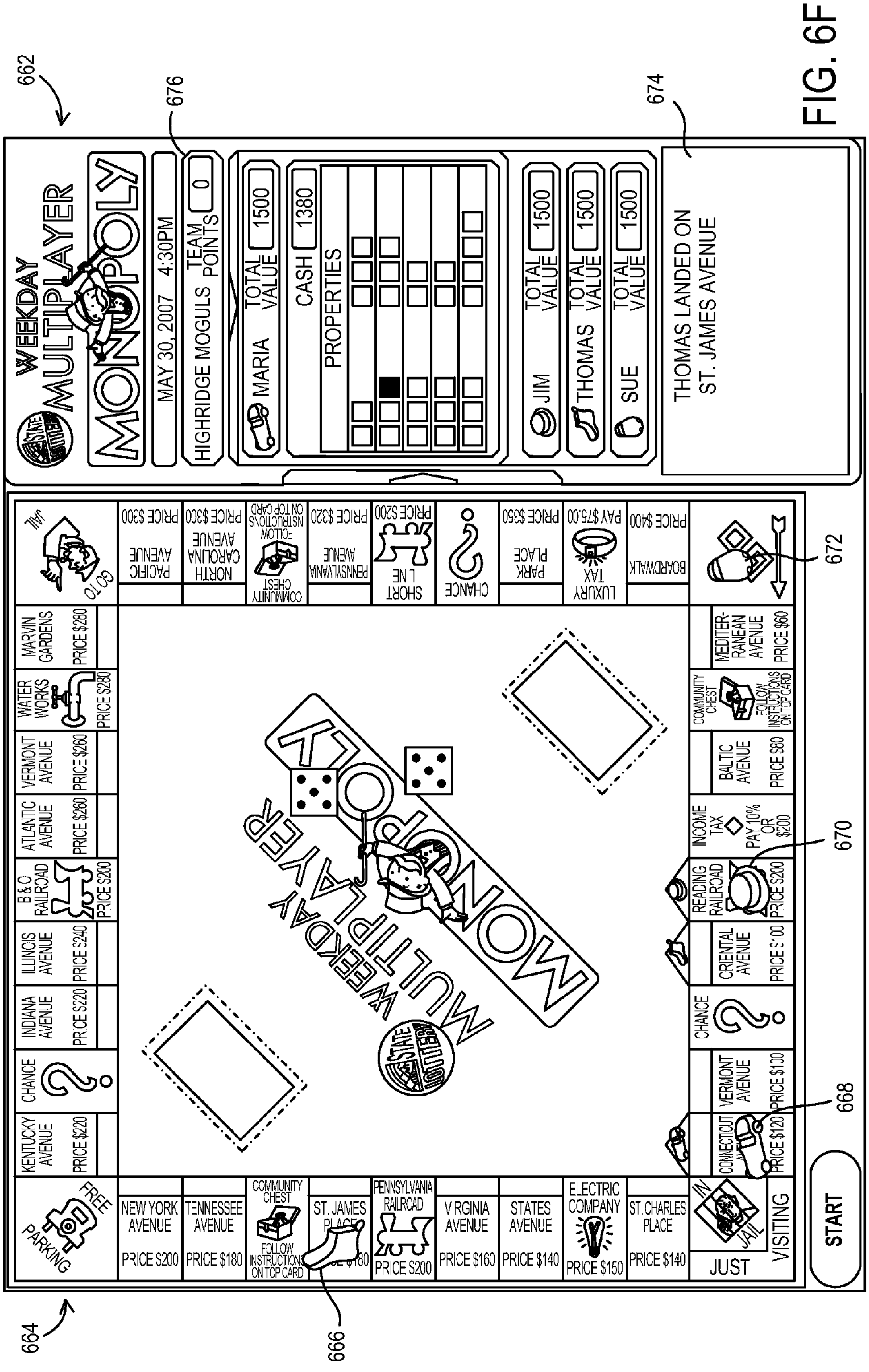
Figure 6G:
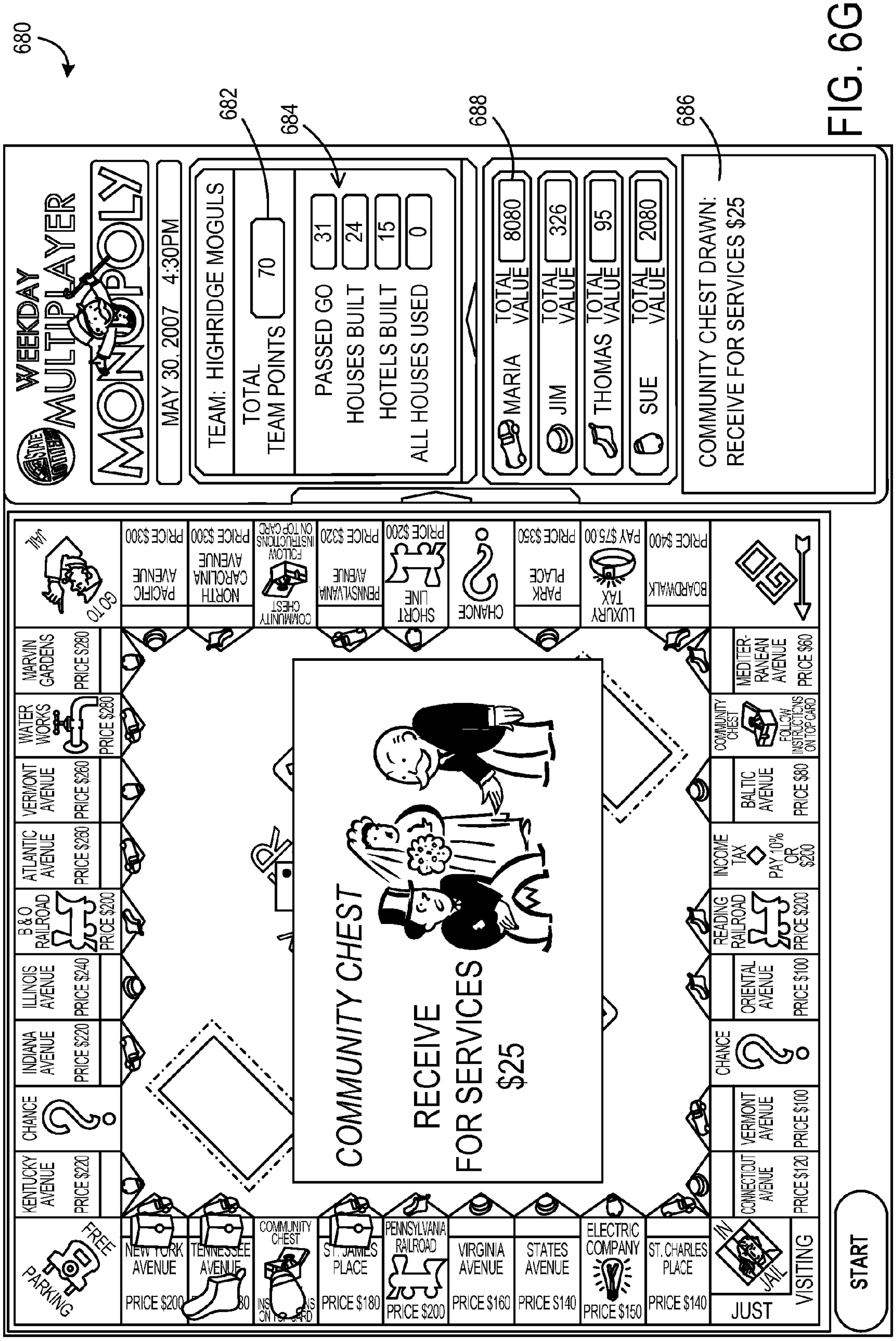

FIGS. 6E to 6G depict examples of displays, game information, game events, and interface elements in accordance with various described embodiments. FIG. 6E shows an initial lottery game board 650 wherein the multiplayer lottery game that has not yet been played by the four players, Maria, Jim, Thomas and Sue. As shown, FIG. 6E includes: a depiction of a "Weekday Multiplayer Monopoly" game board 652; a team name 654 ("Highridge Moguls"); a total team points field 656, indicating a total number of points earned by the group, which may be applicable in determining an aggregate performance associated with the multiplayer group as a whole; statistical data fields 658 indicating values associated with individual game performance parameters associated with the group or team, which may also be applicable in determining an aggregate performance associated with the multiplayer group as a whole and; individual team player points field 660, indicating individual values which may be applicable in determining individual members' performance in the multiplayer game relative to other members of the group and/or other members of other groups/teams. FIG. 6F illustrates the lottery multiplayer game 662 (of FIG. 6E) in progress. In particular, the game board 664 shows the icons 666, 668, 670 and 672 are being moved around the board, and includes an indication 674 that the player "Thomas" has landed on St. James Avenue. At this stage of play, no team points 676 have been awarded. FIG. 6G illustrates the same game instance at an advanced stage, wherein the "Highridge Moguls" have accumulated 70 team points 682, and various statistics of team play 684 have been accumulated. For example, Sue has accumulated a total value of 2080 points, Jim a total value of 326 points, Thomas a total value of 95 points, and Maria is in the lead with a total value of 8080 points. In addition, at this stage of the game, FIG. 6G shows that a Community Chest card has been drawn 686.

7. Processes for Group Lottery Play

Figure 7:
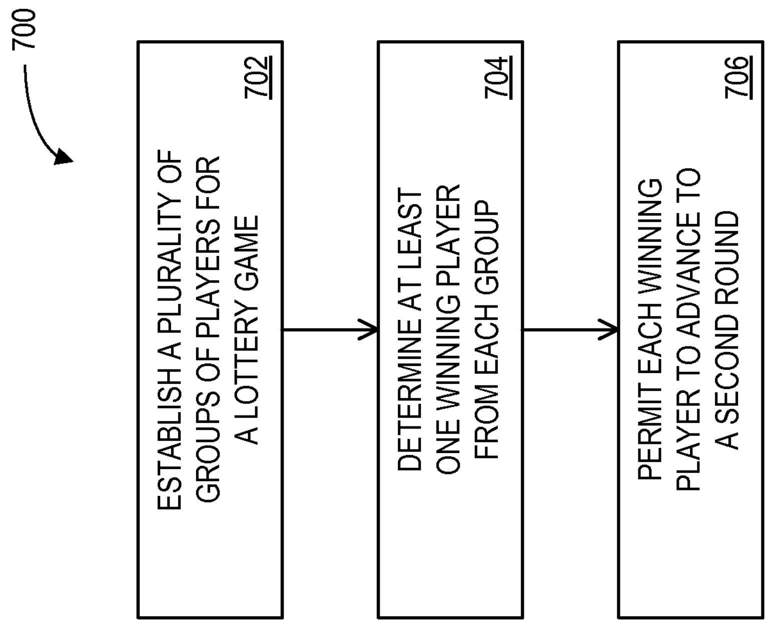
FIG. 7 is a simplified flowchart of an embodiment of a process for determining which particular players of a plurality of groups of players will be permitted to go onto a further round of lottery game play.

FIG. 7 is a simplified flowchart of an embodiment of a process 700 for determining which particular player(s) of a plurality of groups of players will be permitted to go onto a further round of lottery game play. It should be understood that the processes described herein may include steps (or elements thereof) that may not be necessary, and that the illustrated steps may be performed in any practicable order.

The process 700 includes establishing 702 a plurality of groups of lottery game players for a particular lottery game. Next, at least one winning player is determined 704 for each group of players. The process also includes permitting each winning player to advance to a second round of the lottery game 706. A prize may or may not be awarded to the winning player at this stage.

In this embodiment, at least one first round of lottery game play is used to determine a winner (at least one winning player) for each group or team participating in the at least one round (for example, based on criteria appropriate to the lottery game and/or the lottery game theme utilized, such as a total number of points earned). The winner or qualifier of the group of players for each group is then permitted to advance, or is advanced, to participate in at least one additional (a second) round of play. For example, each winning player of the first round could be notified by email, telephone, and/or regular mail (depending on the type of multiplayer lottery game being played) that he or she has qualified to advance to a second round of game play. The second round of play may include group play of the same lottery game, or a related lottery game, or a different lottery game. In addition, qualifying players may be organized into multiple (new) groups comprised of winning players from the first round of game play (for example, players may be organized into groups randomly, by geographical region, and/or based on some other criteria) for the second round of play. In addition, one or more additional rounds of lottery game play may occur (e.g., after a second round), depending on the type of lottery game. Advancement of lottery players may occur in a manner similar to how teams advance in a tournament (such as the NCAA basketball tournament), wherein a winner of a particular round is paired to compete with another winner of that tournament stage round. Such pairings may be scheduled to occur simultaneously (for example, the second round may be a drawing that occurs on Monday night at 8 pm) or may be staggered (for example, selected pairings of players are notified that they are scheduled to play on particular weekday nights chosen from the weekdays occurring from Jul. 1 to Jul. 15, 2008, after which third round winning players will be announced and prizes will be awarded).

In some embodiments, play of the first (or qualifying) round(s) may differ from play of the second or later or additional round(s). For instance, at least one player in a qualifying round may earn a prize (for example, an instant cash prize based on an in-game event associated with the first round), even if the particular player does not advance any further in that lottery game (e.g. into one or more round(s) of lottery game play). However, prizes in the subsequent round (for example, in which only players qualifying in the earlier round may participate) may only be given to one player.

A plurality of groups of players may be participating in any given round of lottery game play. In addition, play of the lottery game may be fully or partially automated, such that game play may proceed without player interaction, or with only minimal player interaction. For example, in some configurations, a player may simply elect to periodically observe his or her progress or status with respect to the initial round of lottery game play.

In some embodiments, information about game play (for example, indications of results, game status, prizes, scores, game play events, and the like) may be transmitted (or otherwise indicated) to one or more lottery players of a group (for example, via email, telephone, wireless PDA, and/or web page).

The play of the group lottery game may not depend on any predetermined outcomes. That is, a winning outcome of a group lottery game may be determined based on events that occur during game play by players of that lottery game. In addition, play of the lottery game may be presented in accordance with and/or based on a desired theme, such as a board game (for example, Monopoly), a puzzle game (for example, crossword puzzles, Sudoku, and the like), a sports game (for example, football, basketball, golf, baseball, a car or horse race), and the like. In an illustrative example, group play of a lottery game may be provided with a board game theme and may occur between several individual players/members having formed a group/team.

Each player of a plurality of lottery game players may be associated with a respective (for example, unique) player number or other identifier. Other embodiments having a plurality of players (for example, a group or team playing together) may be associated with a respective (for example, unique) number that identifies that plurality of players as a group or team (and, optionally, the particular game and/or instance of the game that they are playing).

Figure 8:
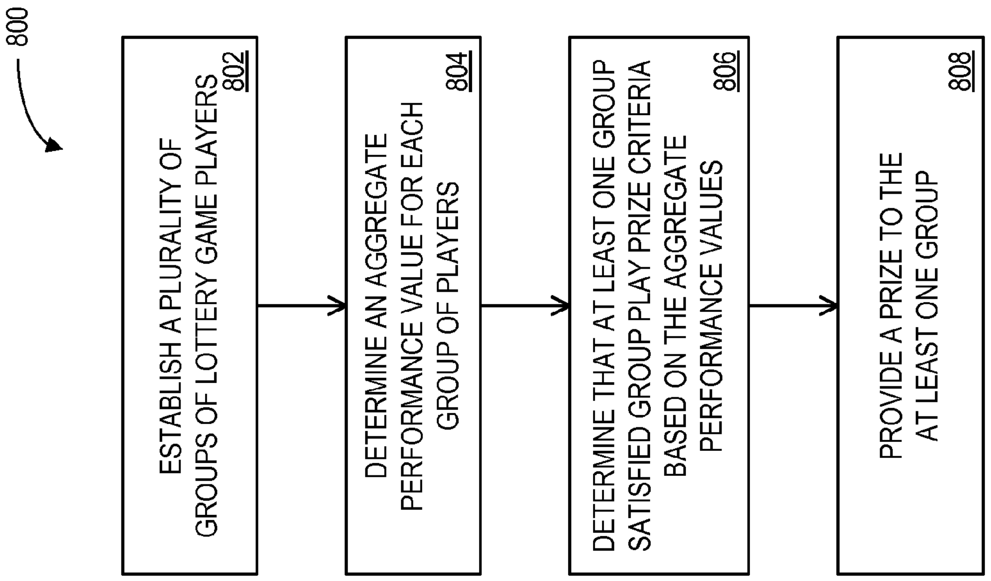
FIG. 8 is a simplified flowchart of an embodiment of a process for providing a prize for a group or team of players who satisfied group play prize criteria.

FIG. 8 is a simplified flowchart of an embodiment of a process 800 for providing a prize for each lottery player of a group or team of players that satisfies predetermined prize criteria. The process includes establishing 802 a plurality of groups or teams of players. For example, a method may include receiving lottery entry data from a plurality of lottery players, and then establishing a plurality of groups based on the lottery entry data so that each group includes two or more players. After at least one initial round of lottery game play, the process determines 804 an aggregate performance value, or overall score, for each group or team of players (e.g. by determining, for each individual group, the point value(s) in field 682 and/or in field 684 of FIG. 6G). The example method is further shown to include determining 806 that at least one of the groups satisfied predetermined group play prize criteria based on the aggregate performance values associated with the groups playing the multiplayer lottery game. The process is further shown to include providing 808 the prize to the group or groups having been determined (at 806) to have satisfied the prize criteria. The aggregate performance value of a group may be based on various criteria, such as a group score obtained by playing one or more lottery games, a group satisfying a predetermined condition (such as the players of a group participating in a minimum number of lottery games), or a group satisfying a predetermined condition within a predetermined period of time (for example, a group of players having achieved a group score greater than one-thousand points in each of ten group lottery games occurring/played within a calendar month). Other group play prize criteria may be used. In addition, group play prize criteria may be posted or otherwise communicated to lottery players so that the players are aware of goals that could be achieved as a team.

In some embodiments, only a specific player of a group or team may activate a lottery game for or on behalf of the entire group. In other embodiments, any one player of the group may activate the group lottery game. In yet other embodiments, more than one player is required to activate the lottery game.

A group lottery game may be ongoing (for example, play may occur every day, or every weekday), and players may elect to activate their participation in any desired instance of the lottery game. In one embodiment, activation and/or lottery game play must take place within a particular time period and/or by a specified date and/or time. In some embodiments, a purchased lottery ticket or activation slip may expire after a predetermined period of time from the time/date of purchase, and/or at a specified date/time. For example, a group of players may purchase a lottery ticket for a group lottery game that occurs every weekday, and the group may activate the group lottery ticket for any weekday they choose within 30 days of the ticket's initial purchase or the ticket will expire.

Group lottery play may take place on the day (and/or in the session, if multiple sessions are conducted each day) of activation. In some embodiments, a player (or group or team of players) may activate a ticket for lottery game play at a future date.

As explained above, group lottery game play may occur over multiple rounds.

Not all of the players of a group or team (and, optionally, no players of the group) may need to actively participate in play of the lottery game. In some embodiments, at least one player must be logged into a lottery game system (for example, via a web site) for play to take place for the corresponding group of lottery game players.

Play may be automated according to rules deemed appropriate for automated play. For example, automated lottery game play of a lottery board game may be conducted for multiple players based on default rules (for example, default options may be specified where decisions otherwise would be required in live or non-automated play).

At least one round of multiple rounds of lottery game play may allow for individual and/or group prizes. Various rules and/or conditions for determining whether a prize has been won in the lottery game may be employed. For example, a prize may be awarded to an individual player based on multiple events in the same or multiple rounds of a lottery game (for example, in the same round, a player satisfies a first condition during a first turn, and then satisfies a second condition during a second turn). Prizes may be awarded to each member of a group based on an aggregate performance of the group (for example, a team or group score), and/or on the group collectively meeting a predetermined condition (or conditions) (for example, at least two players roll 6's in the same round). Individual and group prizes may be based on criteria corresponding to a predetermined period of time (for example, a player may win a prize for having the highest average (or actual) score during a designated month).

Prize conditions may be configured to encourage at least one lottery player of a group to log in to and/or to interact with a lottery game system (for example, if a lottery player is logged in to a lottery game web site when a specified event takes place, that player wins a prize).

In some embodiments, a player may be permitted to customize or configure aspects of group lottery game play.

In some embodiments, if a winner of a group who advances to an additional round of play wins the additional round(s), then every member of the group receives a prize or other benefit.

8. Database Examples

FIG. 9 is a tabular representation of an embodiment of a Player database 900 that may be utilized by a lottery server 402 or a lottery operator controller 300. In general, a Lottery Player database such as that shown in FIG. 9 stores information corresponding to (or associated with) individual lottery players and their associated groups.

Referring to FIG. 9, the Lottery Player database 900 includes a player identifier field 902 for storing unique data identifying the particular lottery player, a player name field 904, a player contact information field 906 (for storing contact information such as player address, email address, phone number and the like), and player/member group identifier fields 908 to 908-N for storing unique one or more unique identifier(s) that link the player to one or more particular groups or teams of (multiple) players. Thus, a player may belong to one group of players, or may belong to several groups, e.g. depending on rules, personal preferences and/or the types of multiplayer lottery games offered.

Each record of FIG. 9, depicted as rows 900-1 to 900-N, thus contains information associated with an individual lottery player participating in one or more multiplayer lottery games. For example, row 900-1 contains information associated with Susan Jones including a player identifier, contact information and data indicating that she is a member of at least two groups identified by a player/member group identifier shown in fields 908-1 and 908-N. Data for the other players depicted in the database 900 (for Thomas Smith, Margret Reed and John Andrews of rows R900-2, R900-3 and R900-N) shows that each of these players is a member of at least one group (see column 908).

FIG. 10 is a tabular representation of an embodiment of a Group database 1000 that may be utilized by a lottery server 402 or a lottery operator controller 300. In general, a lottery Group database 1000 such as that shown in FIG. 10 stores data associated with individual groups of lottery players, each individual group comprising at least two individual players.

Referring to FIG. 10, the lottery Group database 1000 includes a Group Identifier field 1002 for storing a unique group identifier that identifies particular lottery groups, a Group Name field 1004, a Group Leader Player identifier field 1006, a Maximum Allowable Players/Members field 1008, and a Quantity/Currently Active Players/Members field 1010 for storing a value indicative of how many players are presently associated with a particular group. Thus, for any particular group, the Maximum Allowable Players/Members field 1008 may store an indication of a limit to the number of players that may belong to one group of players, which e.g. may be dependent on the type (or instance) of multiplayer lottery game that the particular group has signed up to play.

Each record of the lottery Group database 1000 of FIG. 10, depicted as rows 1000-1 to 1000-N, thus contains information associated with each group participating in at least one type of multiplayer lottery game. For example, row 1000-1 contains information associated with group of players nicknamed "The Fab Fifteen", which is shown to currently include 11 active members. In addition, the database 1000 of FIG. 10 depicts data for two other groups, including row R1000-2 for the "Local 2211 Locomotives" group having 215 members, and row R1000-N for the "Metropolitan Fanatics" having 10 members, for use by a lottery server to administer various aspects of multiplayer lottery games.

FIG. 11 is a tabular representation of an embodiment of a Group Play Games database 1100 that may be utilized by a lottery server 402 or a lottery operator controller 300. In general, a lottery Group Play Games database 1100 such as that shown in FIG. 11 stores data that associates groups of lottery players with particular types (or available instances) of multiplayer lottery games and the rules corresponding each type of multiplayer lottery game.

Referring to FIG. 11, the lottery Group Play Games database 1100 includes a Group Play Game Identifier field 1102 for identifying a particular type of game (e.g. as defined by one or more rule(s) associated with the game), a Group Play Game Name field 1104, a Group Play Game Type field 1106, and Group Play Game Rules fields 1108 to 1108-N. Thus, for any particular lottery game, a lottery server can access the Group Play Games database to determine whether it is a competitive, collaborative, or combination type of lottery game, and utilize one or more rule(s) associated with the particular game/game type to administer instances of the associated lottery game (e.g. to determine one or more winning individual(s) and/or group(s)).

Each row of FIG. 11, depicted as rows 1100-1 to 1100-N, thus contains information associated with each type of multiplayer lottery game that is offered by a lottery administrator. For example, row 1100-1 contains information pertinent to the "Mid-Day Monopolization" lottery game, which is a competitive game governed by the rules shown in columns 1108 to 1108-N. In addition, the Group Play Games database 1100 of FIG. 11 depicts data for two other multiplayer lottery games, the "Match & Win" collaborative type of lottery game of row R1100-2, and the "Predict & Win" game, which is a combination competitive and collaborative type of game having rules shown in fields 1108 to 1108-N of row R1100-N.

Thus, the data in each row of FIG. 11 is utilized by a lottery server, for example, to administer the various types of multiplayer lottery games offered by a lottery operator.

FIG. 12 is a tabular representation of an embodiment of a Group Play Payout database 1200 that may be utilized by a lottery server 402 or a lottery operator controller 300. In general, the Group Play Payout database 1200 of FIG. 12 contains payout criteria and the types of group play lottery game payouts available for players who meet the payout criteria (e.g. based on one or more rule(s) associated with a particular game type and/or game instance).

Referring to FIG. 12, the Group Play Games Payout database 1200 includes a Group Play Game Identifier field 1202 for storing unique Group Play Game Identifiers that identify each type of game that may be played (e.g. offered in a particular lottery jurisdiction), Group Play Payout Criteria fields 1004 to 1004-N, and Group Game Payout fields 1006 to 1006-N. Thus, for any particular type of lottery game, there may be one or more payout criteria, and one or more group game lottery payouts available to winning players of any particular group or team of players, dependent on the satisfaction of the one or more payout criteria associated with the particular type of lottery game.

Each row of FIG. 12, depicted as rows 1200-1 to 1200-N, thus contains group play payout criteria and group game payouts associated with each type of multiplayer game offered by the lottery operator. For example, row 1200-1 contains information associated with the group play game "GPG-001", which is the "Mid-Day Monopolization" game (see FIG. 11). If a player of that game meets Criteria 1 shown in column 1204 by completing play with the greatest total assets of his group, for example, then that player wins an individual bonus (i.e. secondary) round entry as shown in column 1206 of row R1200-1. Furthermore, if any player completes play having acquired all the utilities (see field 1204-N of R1200-1), then each player of that group wins a five dollar cash prize (see field 1206-N of R1200-1). The database 1200 of FIG. 12 also depicts data for two other Group Play Games, GPG-002 and GPG-00N, which correspond to the "Match & Win" and "Predict & Win" games, respectively, shown in FIG. 11. Similar to the description of the "Mid-Day Monopolization" game data above, if a player of a group matches any of the winning criteria shown in fields 1204 to 12-4-N, that player wins the payout(s) shown in the corresponding fields 1206-1206-N. Thus, a lottery server utilizes the data in the Group Play Games Payout database 1200 to award appropriate prizes to players of various multiplayer lottery games who match the winning criteria (Group play payout criteria).

FIG. 13 is a tabular representation of an embodiment of a Group Play Ticket Status database 1300 that may be utilized by a lottery server 402 or a lottery operator controller 300. In general, a lottery Group Play Ticket Status database 1300 such as that shown in FIG. 13 stores data associated with a particular group of players associated with a particular group play game type as well an instance of the group play game of the group play game type and includes data associated with each member/player (and/or one or more associated member/player lottery entries) of that group.

Referring to FIG. 13, the lottery Group Play Ticket Status database 1300 includes a Group Identifier 1302, a Group Play Game identifier 1304 and a Group Play Game Instance identifier 1305. In this example, the Group Identifier is "ABC-276543C" which corresponds to the group named "The Fab Fifteen" shown in the group database of FIG. 10. The Group Play ticket Status database also includes a Member Ticket identifier 1306 field, Member Ticket Indicia fields 1308 to 1308-N, Member Ticket Result field 1310, and a Member Ticket Status field 1312. Thus, in the example database 1300 of FIG. 13, a lottery server may utilize the data to determine the status of any particular lottery ticket for any particular member of this group.

For example, the group play game identifier 1304 of "GPG-002" of FIG. 13 corresponds to a "Match & Win" game, and the Group Play Game database 1100 depicted in FIG. 11 includes an entry for "GPG-002" (see row R1100-2) indicating that the "Match & Win" game is a collaborative type group play game wherein player numbers are compared/matched to drawn numbers (see Group Play Game Rule 1 to Rule N (columns 1108 and 1108-N)). In addition, the Group Play Payout database 1200 of FIG. 12 indicates, in row R1200-2, the group payout criteria 1 to N (columns 1204 and 1204-N) that players must satisfy in order to obtain any of the possible group game payouts 1 to N. In this example for the "Match & Win" game GPG-002, each player of the group receives a payout of two dollars if the ratio of total group numbers to matched numbers is less than 3.5 to 1. And/or if the total quantity of matched numbers is greater than 40 and the group size is less than 15, the group game payout N is twenty dollars per group. Thus, the data contained in the Group Play Games database 1100, in the Group Play Payout database 1200, and in the Group Play Ticket Status database 1300 can be used together, for example, to determine when and/or if a player or players has won a prize and/or has advanced to a secondary round of multiplayer lottery game play.

Referring again to FIG. 13, each member record shown in rows 1300-1 to 1300-N contains information associated with each member or player of a particular group (in this example, the group "The Fab Fifteen"). For example, row 1300-1 contains information associated with ticket identifier ABC-276543C-011, which is associated with Susan Jones (see also the Player Database 900 of FIG. 9). The data in this row indicates that Susan Jones matched 2 of 6 indicia and that her member ticket status is "pending/unredeemed" to indicate that she has a winning ticket and has not yet redeemed it. In addition, the database 1300 depicts data for three additional member tickets, including row R1300-2 which has a status of "closed" to indicate a non-winning entry, R1300-3 which also has a status of "closed" to indicate a non-winning entry, and R1300-N which has a status of "redeemed/closed" to indicate a winning entry for which a prize has been claimed. It should be understood that in some embodiments of multiplayer lottery games, a player is required to tender his or her multiplayer game lottery ticket to a lottery retailer or other designated agent in order to redeem a winning ticket. In some embodiments, to be eligible for a prize, a players' lottery ticket identifier must match data stored in the Group Play Games Payout database, which includes a record of all lottery tickets valid for redemption. Such a group play payout database may be populated immediately following (or concurrent with) a lottery drawing, for example.

9. Example Embodiments

A. Weekday Multiplayer Monopoly

The following description includes illustrative examples of some of the systems, methods, and apparatus contemplated by this disclosure, which are not limiting to any particular embodiment. References to specific requirements in these examples are not requirements for all embodiments described in this disclosure.

Weekday Multiplayer Monopoly is an exciting new variation of the classic board game that uses an online ticket purchased at retail for a group play game that plays out on the Web (the internet). The game play rules are similar to those of an actual Monopoly game with no pre-determined outcomes. In an implementation, Weekday Multiplayer Monopoly features two rounds of daily play, 10 AM-4 PM and 7 PM-9 PM, every Monday through Friday.

Each Weekday Multiplayer Monopoly ticket purchased by a player includes a group activation slip with a group play activation number on it, and four individual player slips, each containing a unique player number (for example, see FIG. 5). A player forms a group or team by choosing three friends/colleagues and giving each of the group members one of the play slips. The individual holding the group activation slip is responsible for activating the game for the whole group. It is contemplated that a player can use the ticket for any Weekday Multiplayer Monopoly game within one year of the date of ticket purchase.

Once a game date has been selected, in accordance with this illustrative example, the person responsible for activation must do so prior to 9:15 AM on the selected date of game play. In this example, group activation must occur prior to any individual group member logging-on to play. (Some embodiments, of course, do not require these specific exemplary timing limitations). Upon activation, the activating group member may configure some of the basic aspects of game play. For example, he or she can select a specific date for group play, assign a team name to the group, upload a group logo, and the like.

Once the activating group member has logged-in, and the game has been configured for the group, game play automatically commences at 10 AM on the selected day of game play. If at that time the other group members have not logged-in and provided their access codes, the game simply begins playing (automatically) on behalf of those players, who may later log-in and check game status.

Part1—The Daytime Round—10 AM-4 PM

Throughout the day, each group member can follow the scoring of their group via their home or work computers. Players can also sign-up to receive e-mails or text messages of updated game scores throughout the day.

The daytime tournament offers several different ways to win cash and prizes on both a group basis and on an individual basis. For example, the Weekday Multiplayer Monopoly daytime round may feature various bonuses, including e.g.:

"Free Parking Group Bonuses", which e.g. allow the entire group to win cash prizes during designated times of the day.

"Savvy Traveler Bonus". E.g. a player who manages to consecutively land on all four Railroad properties in a single trip around the game board instantly wins a large cash prize.

"Travel & Utilities Mogul Bonus". E.g. a player who finishes the daytime game having acquired and retained all Utility and Railroad properties also receives an instant cash prize.

"Instant-Win Chance and Community Chest Cards". E.g. from time to time within the daytime game, certain Chance and Community Chest cards can award instant cash prizes.

Periodic team performance bonuses for every member of a group including "Team of the Week", "Team of the Month", and the like. Such bonuses could be based on predetermined criteria, such as the number of active or inactive lottery players in the group, the number of participating lottery players of the group in a predetermined time period, group and/or individual point totals and/or the amount of money spent by the group purchasing and playing multiplayer games within a predetermine time period; and Daily performance bonuses for group total houses built, group total times past "Go", and the like.

In this particular example, Weekday Multiplayer Monopoly plays as an actual board game would play. There are no pre-determined outcomes. The first round (day tournament) of game play determines a first round winner for each group based on a game play algorithm and the basic rules of classic Monopoly. Individual group winners are determined based on their total asset value including cash and properties at the conclusion of the daytime game (or at 4:00 PM, whichever is first). Once group winners are determined, those winners are "promoted" or "advanced" to the evening (or "big money") round of play. In some embodiments, the player who is the team winner of the group is able to access the evening round by utilizing the previously provided player access codes and/or daytime tournament game results.

Part 2—The Evening Tournament

In one embodiment, the second round of play, which may be referred to as the evening tournament, begins at 7:00 PM and ends at 9:00 PM. During this round, players are randomly teamed up for multiple, fast-paced games, which play throughout the evening. At the end of the two-hour series of games, the individual with the greatest overall cumulative asset value total wins the top available (pari-mutuel) prize. In some implementations, as a group incentive, if your group member wins the grand prize, all members of the team win individual cash prizes as well.

Weekday Multiplayer Monopoly uses a pre-established Lottery Website as an electronic game board enabling players to monitor scores and view their games as they unfold throughout the day.

The game allows individuals to name their team, track the scores of other Weekday Multiplayer Monopoly teams in the area, receive bonus points for consistent team play and win cash prizes.

B. Match & Win/Group Fantasy Play

In an implementation, a Group Fantasy Play lottery game enables individual lottery players to participate in group games, such as office pools, in a unique, new and easy way. An online group lottery ticket configuration and tracking system can be used by an individual player to assemble groups of friends or colleagues to play lottery games together, and to monitor group play activity in an easy fashion. In addition, such an implementation permits group play to be monitored over the course of several drawings (and/or over time), and provides a way to monitor payouts and merchandise awards that accumulate over time based on the group's overall performance.

In addition to playing for the big game jackpot, the Group Fantasy Play game can include an ongoing monthly fantasy prize play component, In some embodiments, this ongoing play component allows the "group" to select a specific fantasy prize (or equivalent cash value) which all group members can qualify to win based on the group's overall monthly performance relative to other, similar-sized groups.

When an individual player registers a group online at the lottery's Group Fantasy Play website, group members can select their numbers in advance for each individual drawing, or the system can select numbers automatically on the players' behalf via a quick pick option. Once the players' numbers are selected, in one implementation, the system will store and track the information for all of the group's entries in a web-based group file. For each individual lottery game drawing, the group's numbers will be checked automatically for each individual entry of the group/pool of entries, with e-mail and/or text-based alerts sent to one, some, or all group members when any amount is won.

An individual player who coordinates the lottery purchase for the group may be deemed the "group administrator" or "team leader", and in some implementations may receive jackpot alerts from the lottery reminding him or her e.g. that the jackpot is over a certain amount, that a lottery drawing is imminent, etc. For example, a lottery server may generate and transmit a jackpot alert every time the jackpot reaches or exceeds $100 million dollars. The group can also use a group-based subscription and/or conditional element that enables teams to be entered only if and when the jackpot is over a certain dollar amount. For example, a group might designate a minimum jackpot amount of $50 million dollars to enable the lottery administrator to automatically enter the group in that lottery game instance. The lottery operator may also be able to incentivize the group administrators by rewarding them with prizes when the group play levels reach or exceed a certain dollar volume, and/or play frequency, and the like.

11. Rules of Interpretation

Numerous embodiments have been described, and are presented for illustrative purposes only. The described embodiments are not intended to be limiting in any sense. The processes described are widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present processes may be practiced with various modifications and alterations. Although particular features may be described with reference to one or more particular embodiments or figures that form a part of the present disclosure, and in which are shown, by way of illustration, specific embodiments, it should be understood that such features are not limited to usage in the one or more particular embodiments or figures with reference to which they are described. The present disclosure is thus neither a literal description of all embodiments nor a listing of features that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are provided for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order that is practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, for example, appropriately programmed general purpose computers and computing devices. Typically a processor (such as a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments need not include the device itself.

The term "computer-readable medium" as used herein refers to any medium that participates in providing data (such as instructions and the like) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Communications may occur via acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Transmission Control Protocol, Internet Protocol (TCP/IP), Wi-Fi, Bluetooth, TDMA, CDMA, Wi-MAX and 3G.

Where databases are described, it will be understood by one of ordinary skill in the art that alternative database structures to those described may be readily employed, and that other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning. Finally, unless a claim element is defined by reciting the word "means" and a function without reciting any structure, it is not intended that the scope of any claim element be interpreted based on the application of 35 U.S.C. §112, sixth paragraph.

The systems and processes described herein are exemplary embodiments, and those skilled in the art will note that various substitutions and modifications may be made to those embodiments without departing from the spirit and scope of the present invention.

What is claimed is:

1. A method, comprising:

establishing, by a lottery controller device in communication with at least one retailer device, at least two groups for play of a group lottery game, wherein each group comprises a plurality of players;

determining, by the lottery controller device, at least one winning player from each group of a first round of the group lottery game;

advancing, by the lottery controller device, each of the winning players to a second round;

establishing, by the lottery controller device for the second round, at least one second group comprising winning players of the first round;

determining, by the lottery controller device from each second group, at least one winning player of the second round;

awarding, by the lottery controller device, a prize to each winning player of the second round;

determining, by the lottery controller device for a winning player of the second round, a player who was in a group with the winning player in the first round, wherein the player did not advance to the second round; and awarding, by the lottery controller device, a prize to the player who was in the group with the winning player in the first round.

2. The method of claim 1, in which determining at least one winning player for each group for the first round comprises comparing lottery entry data for each player of each group to at least one winning lottery ticket criteria.

3. The method of claim 1, further comprising awarding a prize to each member of the group associated with a grand prize winning player.

4. The method of claim 1, in which determining at least one winning player from each group of a first round comprises basing a winning outcome for the winning player on at least one event occurring during group lottery game play.

5. The method of claim 1, further comprising receiving player identification data and group identification data from at least one of a retailer device or a player device.

6. The method of claim 1, further comprising storing group play lottery data in a group play ticket status database.

7. The method of claim 6, wherein the group play lottery data comprises at least one of a group identifier, a group play game identifier, a group play game instance identifier, group member ticket indicia, or group member ticket status data.

8. A method, comprising:

establishing at least two groups for play of a group lottery game, wherein each group comprises a plurality of players;

determining, by a lottery controller device in communication with at least one retailer device, at least one winning player from each group of a first round of the group lottery game;

advancing, by the lottery controller device, each of the winning players to a second round; and awarding, by the lottery controller device, a group performance bonus for each player of a group that meets at least one predetermined criterion for aggregate performance by the group as a whole.

9. The method of claim 8, wherein the at least one predetermined criterion comprises a number of players in the group.

10. The method of claim 8, wherein the at least one predetermined criterion comprises a number of participating players of the group in a predetermined time period.

11. The method of claim 8, wherein the at least one predetermined criterion comprises an amount of money spent by the group playing group lottery games in a predetermined time period.

12. The method of claim 8, wherein the at least one predetermined criterion comprises an aggregate point total earned by a plurality of players of the group in the group lottery game.

13. The method of claim 8, wherein awarding a group performance bonus for each player of a group that meets at least one predetermined criterion comprises:

determining, by the lottery controller device, a measure of performance of a plurality of players of the group as a whole;

determining, by the lottery controller device, that the measure of performance of the plurality of players of the group as a whole satisfies the at least one predetermined criterion; and awarding the group performance bonus to each of the plurality of players.

14. An apparatus, comprising:

a processor;

a communication device operatively coupled to the processor; and a data storage device operatively coupled to the processor and containing instructions configured to direct the processor to:

establish at least two groups for play of a group lottery game, wherein each group comprises a plurality of players;

determine at least one winning player from each group of a first round of the group lottery game;

advance each of the winning players to a second round;

establish, for the second round, at least one second group comprising winning players of the first round;

determine, from each second group, at least one winning player of the second round;

award a prize to each winning player of the second round;

determine, for a winning player of the second round, a player who was in a group with the winning player in the first round, wherein the player did not advance to the second round; and award a prize to the player who was in the group with the winning player in the first round.

15. The apparatus of claim 14, further comprising a printer configured for producing a group play lottery ticket.

* * * * *